United States Patent
Chen et al.

(10) Patent No.: US 8,848,520 B2
(45) Date of Patent: Sep. 30, 2014

(54) APERIODIC SOUNDING REFERENCE SIGNAL TRANSMISSION METHOD AND APPARATUS

(75) Inventors: Wanshi Chen, San Diego, CA (US); Peter Gaal, San Diego, CA (US); Juan Montojo, San Diego, CA (US); Tao Luo, San Deigo, CA (US); Xiliang Luo, Northbridge, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 13/023,957

(22) Filed: Feb. 9, 2011

(65) Prior Publication Data

US 2011/0199944 A1    Aug. 18, 2011

Related U.S. Application Data

(60) Provisional application No. 61/303,244, filed on Feb. 10, 2010.

(51) Int. Cl.
| | |
|---|---|
| H04L 12/16 | (2006.01) |
| H04W 4/00 | (2009.01) |
| H04L 12/28 | (2006.01) |
| H04B 7/005 | (2006.01) |
| H04L 5/00 | (2006.01) |
| H04W 72/04 | (2009.01) |
| H04W 24/10 | (2009.01) |
| H04W 72/08 | (2009.01) |

(52) U.S. Cl.
CPC ........... *H04W 72/042* (2013.01); *H04L 5/0053* (2013.01); *H04W 24/10* (2013.01); *H04W 72/085* (2013.01); *H04L 5/0057* (2013.01); *H04L 5/0007* (2013.01)

USPC ........... 370/229; 370/332; 370/341; 370/431; 455/509

(58) Field of Classification Search
USPC ................. 370/229–240, 252, 310–350, 431, 370/436–439, 461–465, 478, 503–529; 455/445–455, 507–517
See application file for complete search history.

(56) References Cited

U.S. PATENT DOCUMENTS 8,437,792 B2 * 5/2013 Malladi et al. ................ 455/522
8,451,803 B2    5/2013 Kitazoe
(Continued)

FOREIGN PATENT DOCUMENTS

| CN | 101617489 A | 12/2009 |
|---|---|---|
| EP | 2023504 A2 | 2/2009 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation" (Release 9), 3GPP TS 36.211 V9.0.0 (Dec. 2009).

(Continued)

*Primary Examiner* — Tri H Phan
(74) *Attorney, Agent, or Firm* — Liem T. Do

(57) ABSTRACT

A method and apparatus for facilitating an aperiodic transmission of a sounding reference signal (SRS) are disclosed. Transmission resources are allocated to the aperiodic SRS transmission. A portion of a first downlink control message is modified to produce a second downlink control message, where the first downlink control message does not trigger an aperiodic SRS transmission. The second downlink message is transmitted.

28 Claims, 24 Drawing Sheets

(56) References Cited

U.S. PATENT DOCUMENTS

| | | | |
|---|---|---|---|
| 2009/0168714 A1 | 7/2009 | Tanaka et al. | |
| 2009/0290514 A1 | 11/2009 | Muharemovic et al. | |
| 2010/0098012 A1* | 4/2010 | Bala et al. | 370/329 |
| 2011/0058505 A1 | 3/2011 | Pan et al. | |
| 2011/0092240 A1* | 4/2011 | Aiba et al. | 455/509 |
| 2011/0310821 A1* | 12/2011 | Kim et al. | 370/329 |
| 2012/0002568 A1* | 1/2012 | Tiirola et al. | 370/252 |
| 2012/0063426 A1* | 3/2012 | Noh et al. | 370/336 |
| 2012/0082124 A1* | 4/2012 | Kwon et al. | 370/329 |
| 2012/0087427 A1* | 4/2012 | Noh et al. | 375/260 |
| 2012/0099553 A1* | 4/2012 | Aiba et al. | 370/329 |
| 2012/0163320 A1* | 6/2012 | Akimoto et al. | 370/329 |
| 2012/0269144 A1* | 10/2012 | Suzuki et al. | 370/329 |
| 2012/0327876 A1* | 12/2012 | Ouchi et al. | 370/329 |
| 2013/0094448 A1* | 4/2013 | Noh et al. | 370/328 |
| 2013/0128855 A1* | 5/2013 | Noh et al. | 370/329 |
| 2013/0223311 A1* | 8/2013 | Wang et al. | 370/311 |

FOREIGN PATENT DOCUMENTS

| | | | | |
|---|---|---|---|---|
| JP | 2009159346 A | | 7/2009 | |
| JP | 2009267997 A | | 11/2009 | |
| JP | 2011523516 A | | 8/2011 | |
| TW | 200944026 A | | 10/2009 | |
| WO | 2008120925 A1 | | 10/2008 | |
| WO | WO-2009046321 | | 4/2009 | |
| WO | WO-2009115563 A1 | | 9/2009 | |
| WO | WO 2009132591 A1 | * | 11/2009 | H04W 72/04 |
| WO | WO-2009132591 A1 | | 11/2009 | |

OTHER PUBLICATIONS

"3rd Generation Partnership Project; Technical Specification Group Radio Access Network; Evolved Universal Terrestrial Radio Access (E-UTRA); Physical layer procedures" (Release 9), 3GPP TS 36.213 V9.0.0 (Dec. 2009).

Ericsson, et al., "On sounding reference signal enhancements", 3GPP Draft; R1-100056, 3RD Generation Partnership Project (3GPP), Mobile Competence Centre ; 650, Route Des Lucioles ; F-06921 Sophia-Antipolis Cedex; France, vol. RAN WG1, no. Valencia, Spain; Jan. 18, 2010, Jan. 12, 2010, XP050417803, [retrieved on Jan. 12, 2010] Section 3.

International Search Report and Written Opinion—PCT/US2011/024394—ISA/EPO—Oct. 25, 2011.

Mitsubishi Electric: "UL Sounding RS Control Signaling for Antenna Selection", 3GPP Draft; R1-073932, 3RD Generation Partnership Project (3GPP), Mobile Competence Centre ; 650, Route Des Lucioles ; F-06921 Sophia-Antipolis Cedex ; France, vol. RAN WGI, no. Shanghai, China; Oct. 2, 2007, XP050107490, [retrieved on Oct. 2, 2007] Section 2.2 table 2.

Mitsubishi Electric: "UL Sounding RS Control Signaling for Closed Loop Antenna Selection", 3GPP Draft; R1-080803, 3RD Generation Partnership Project (3GPP), Mobile Competence Centre ; 650, Route Des Lucioles ; F-06921 Sophia-Antipolis Cedex ; France, vol. RAN WGI, no. Sorrento, Italy; Feb. 5, 2008, XP050109286.

Nokia Siemens Networks et al: "Channel sounding enhancements for LTE-Advanced", 3GPP Draft; R1-094653, 3RD Generation Partnership Project (3GPP), Mobile Competence Centre ; 650, Route Des Lucioles ; F-06921 Sophia-Antipolis Cedex ; France, no. Jeju; Nov. 9, 2009, XP050389058,.

Samsung: "Configuring SRS Transmissions in Rel.10", 3GPP Draft; R1-100133 SRS Configurations, 3RD Generation Partnership Project (3GPP), Mobile Competence Centre ; 650, Route Des Lucioles ; F-06921 Sophia-Antipolis Cedex; France, vol. RAN WG1, no. Valencia, Spain; Jan. 18, 2010, Jan. 12, 2010, XP050417858, [retrieved on Jan. 12, 2010] Sections 1, 3.1 and 3.2.

Samsung: "SRS Transmission Issues for LTE-A", 3GPP Draft; R1-090100 LTE-A SRS, 3RD Generation Partnership Project (3GPP), Mobile Competence Centre ; 650, Route Des Lucioles ; F-06921 Sophia-Antipolis Cedex; France, no. Ljubljana; Jan. 7, 2009, XP050318042, [retrieved on Jan. 7, 2009] Sections 1 and 3.

3GPP TSG RAN WG1 #56, R1-090584 Athens, Greece, Feb. 9-13, 2009, ""Texas Instruments"", Downlink and Uplink Control to Support Carrier Aggregation, Agenda Item: 12.1, p. 1-5.

3GPP TSG-RAN WG1 Meeting #52 R1-080918, Sorrento, Italy, Feb. 11-15, 2008, "SRS Position for EUTRA FDD and TDD", Nokia, Nokia Siemens Networks, Discussion and decision, p. 1-2.

Taiwan Search Report—TW100104447—TIPO—Apr. 4, 2014.

* cited by examiner

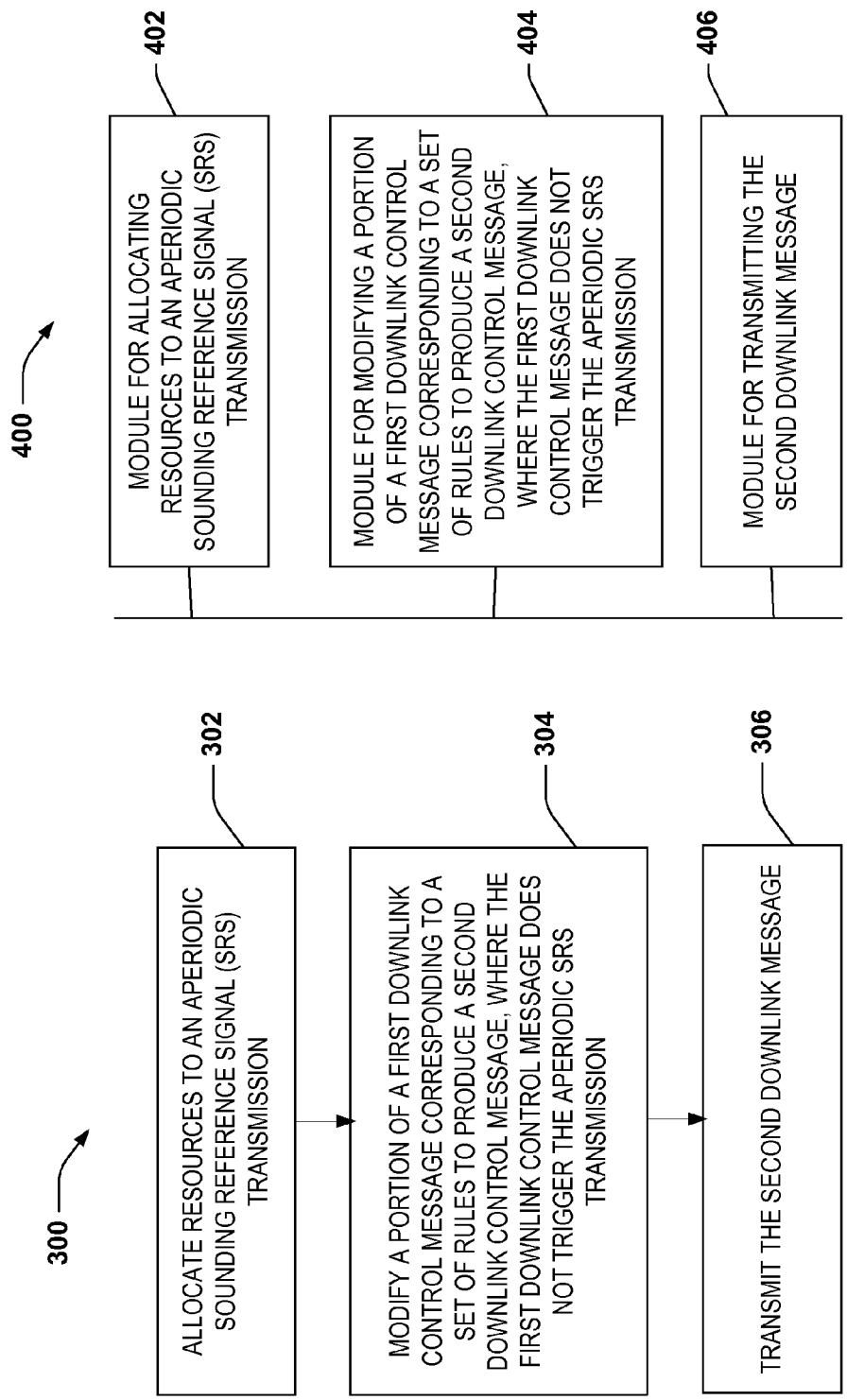

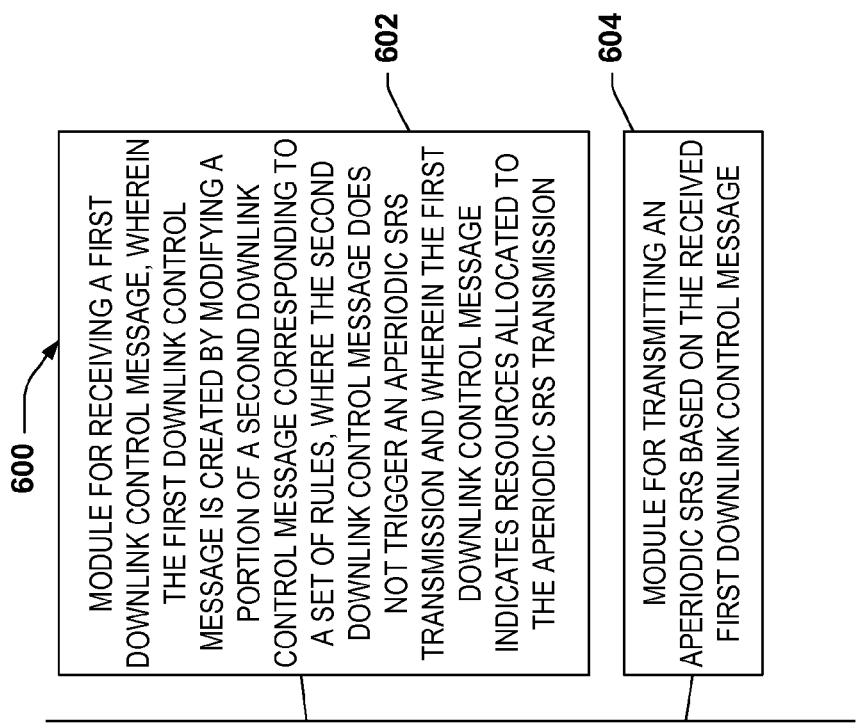
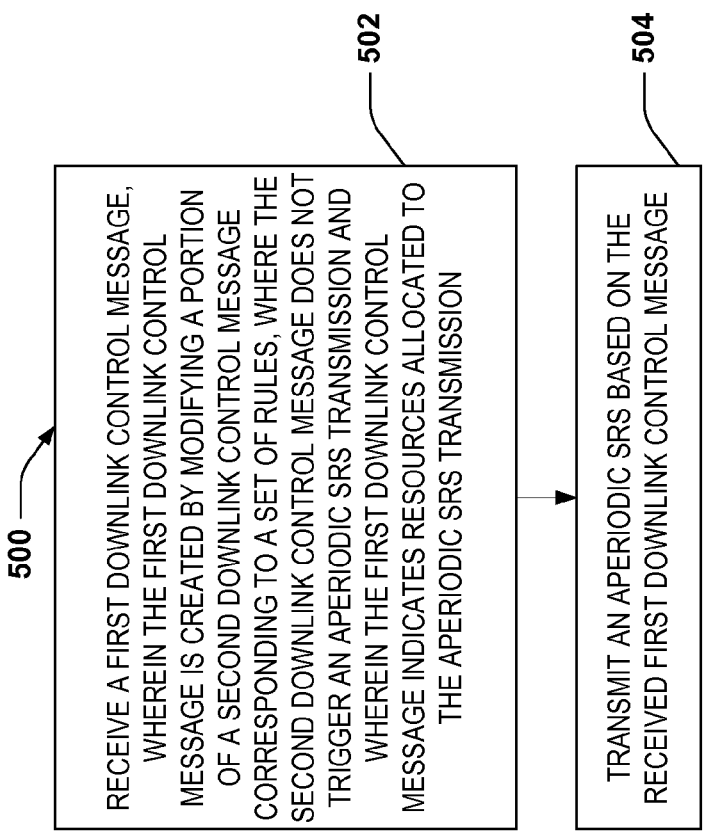

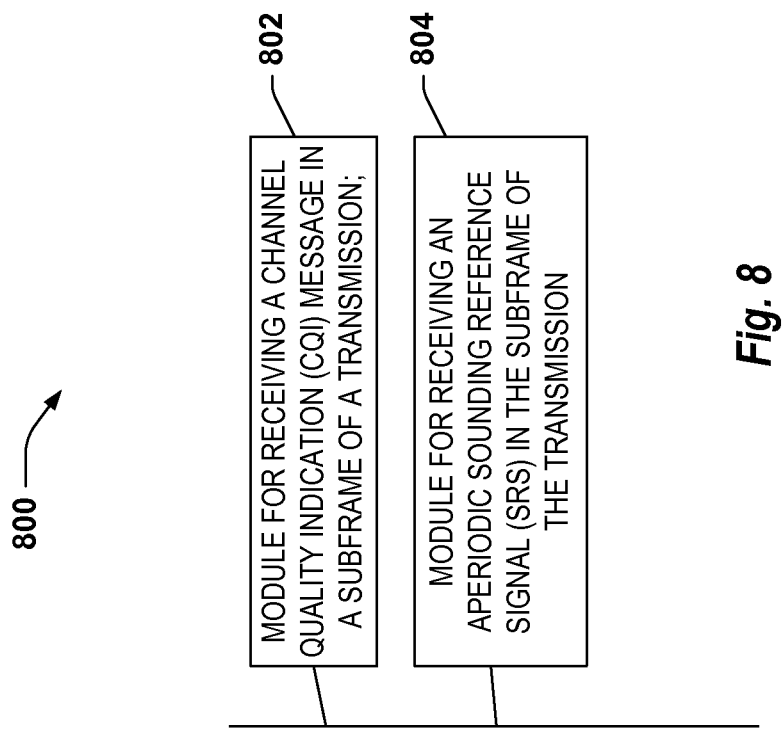
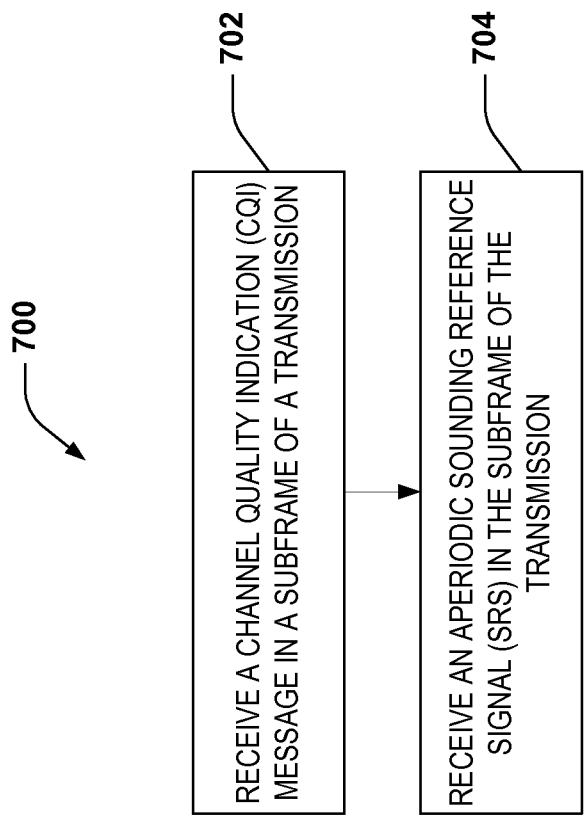

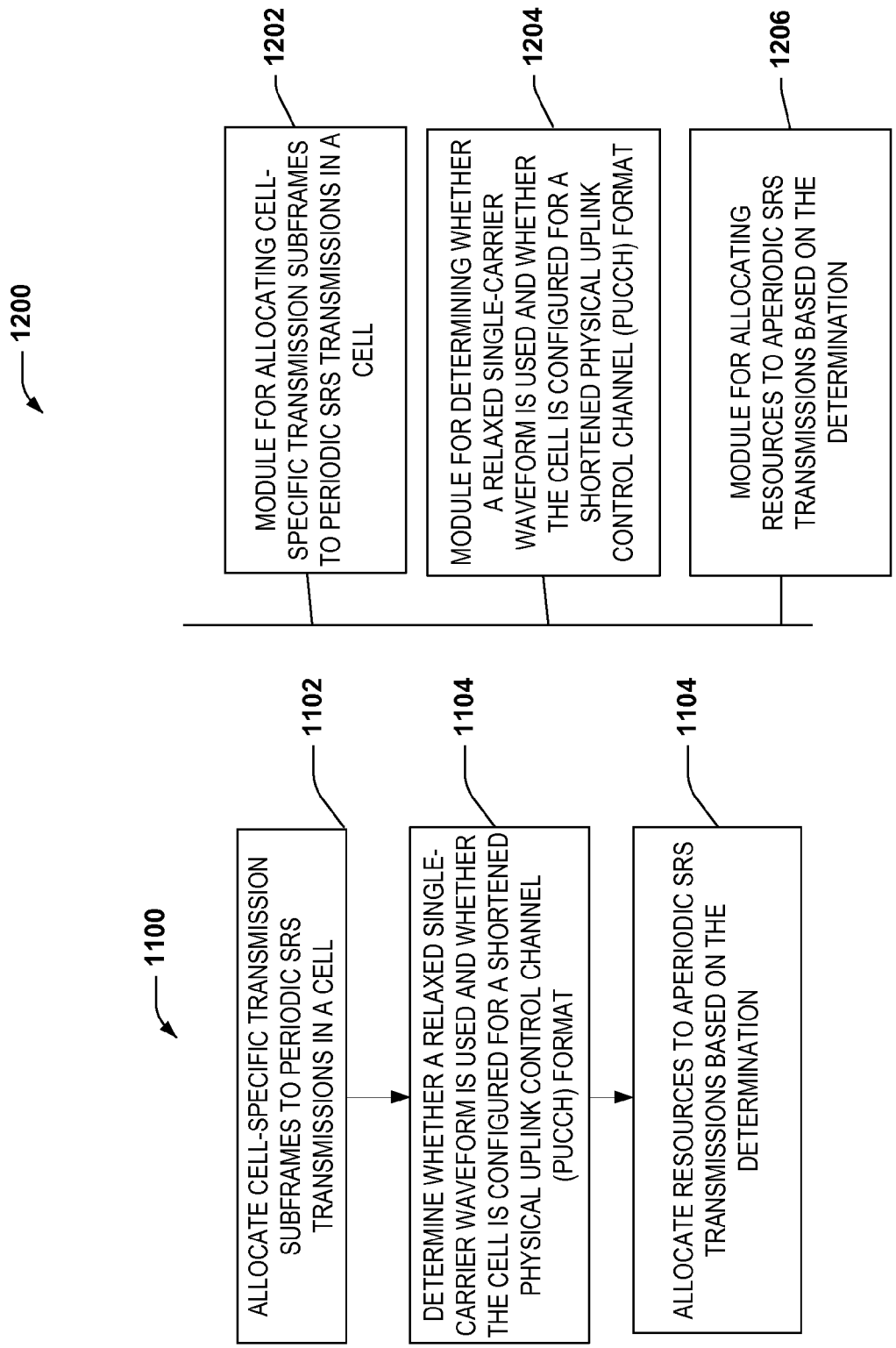

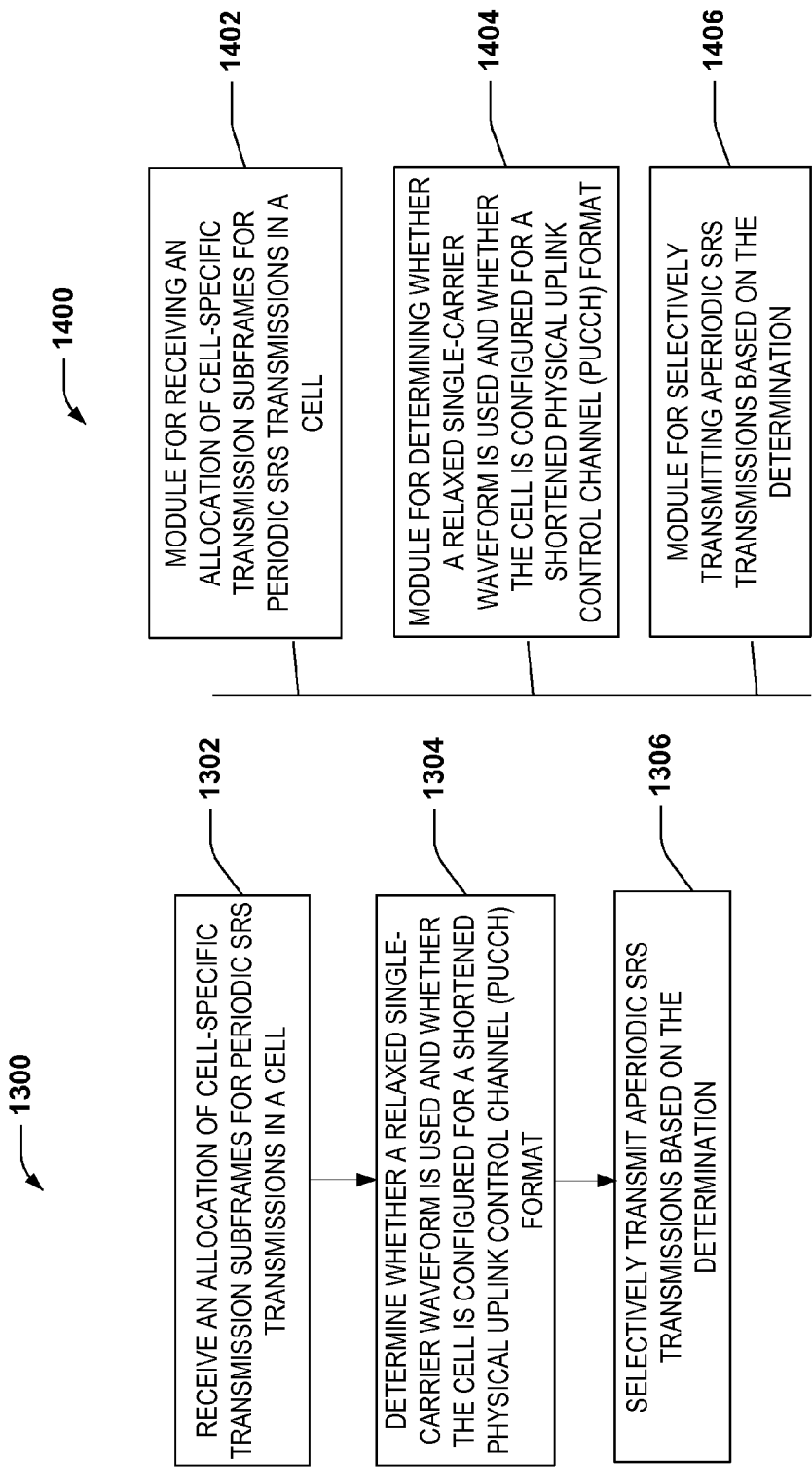

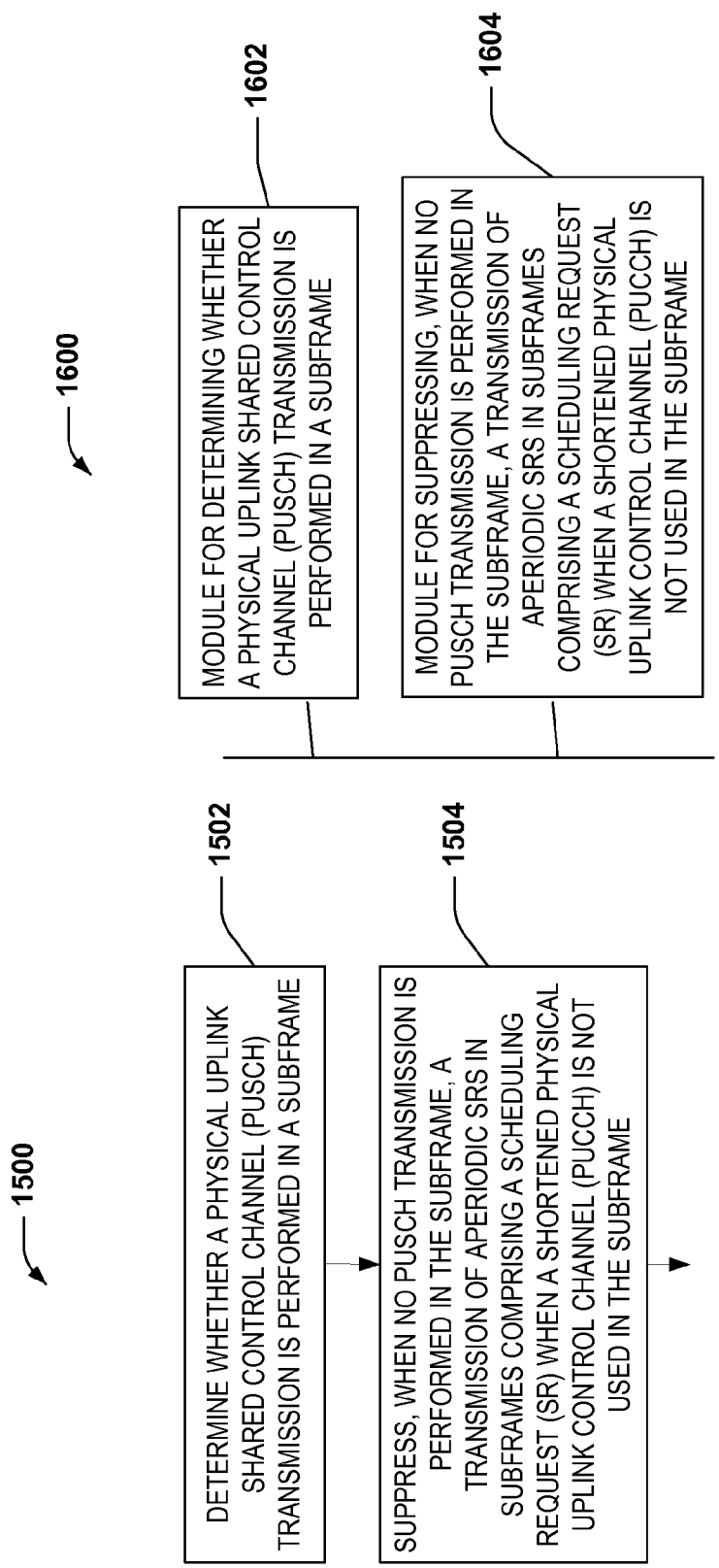

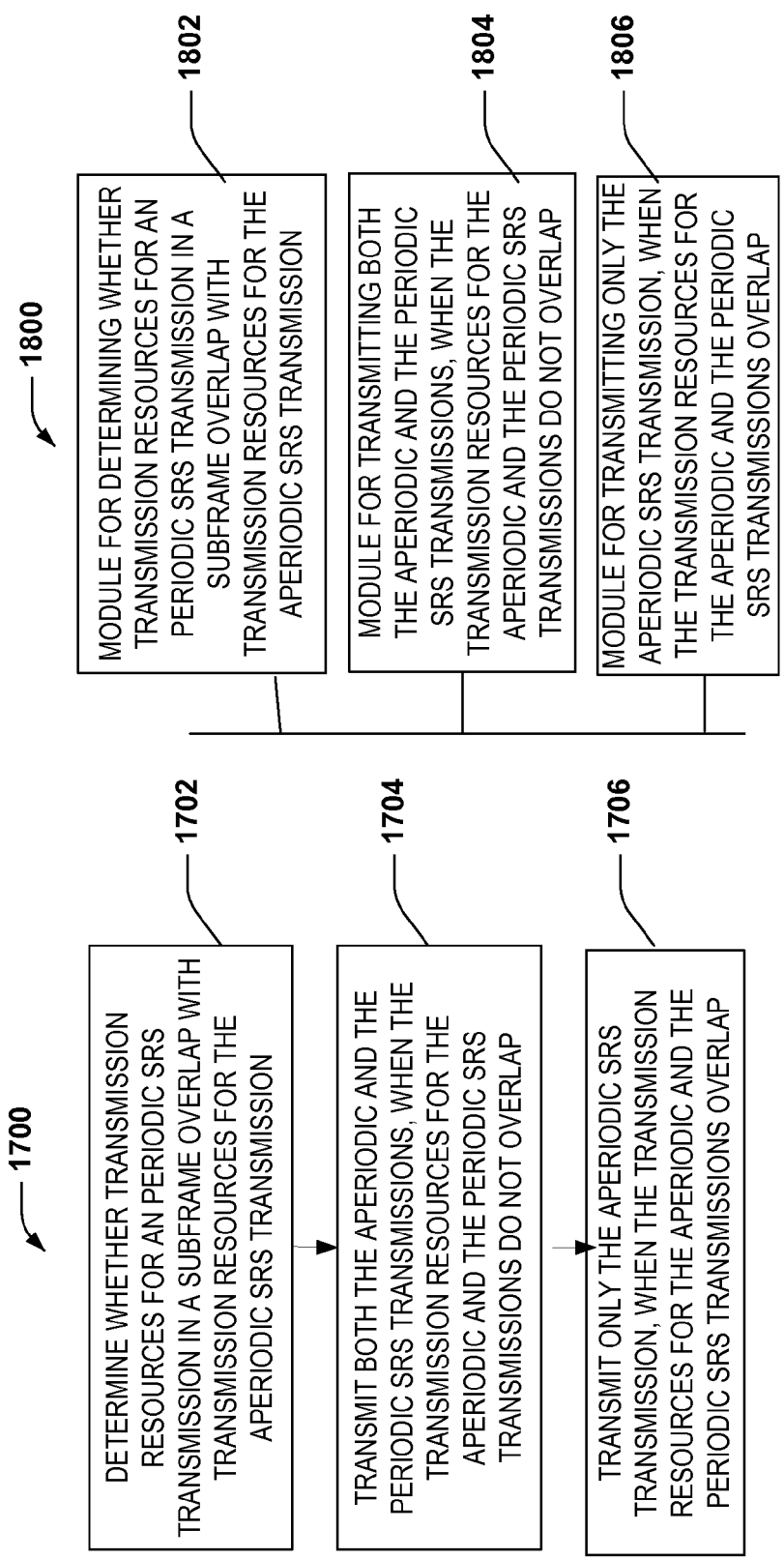

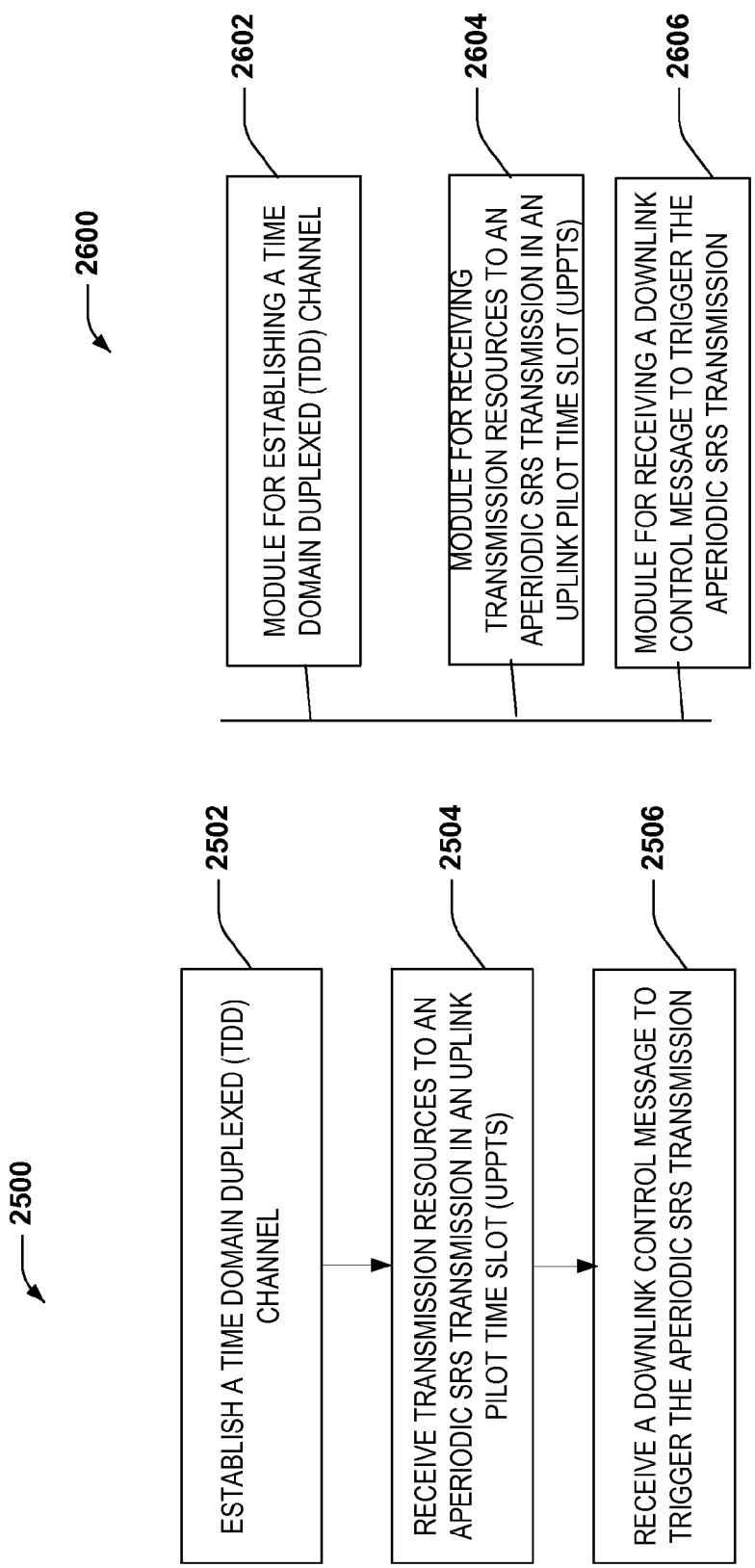

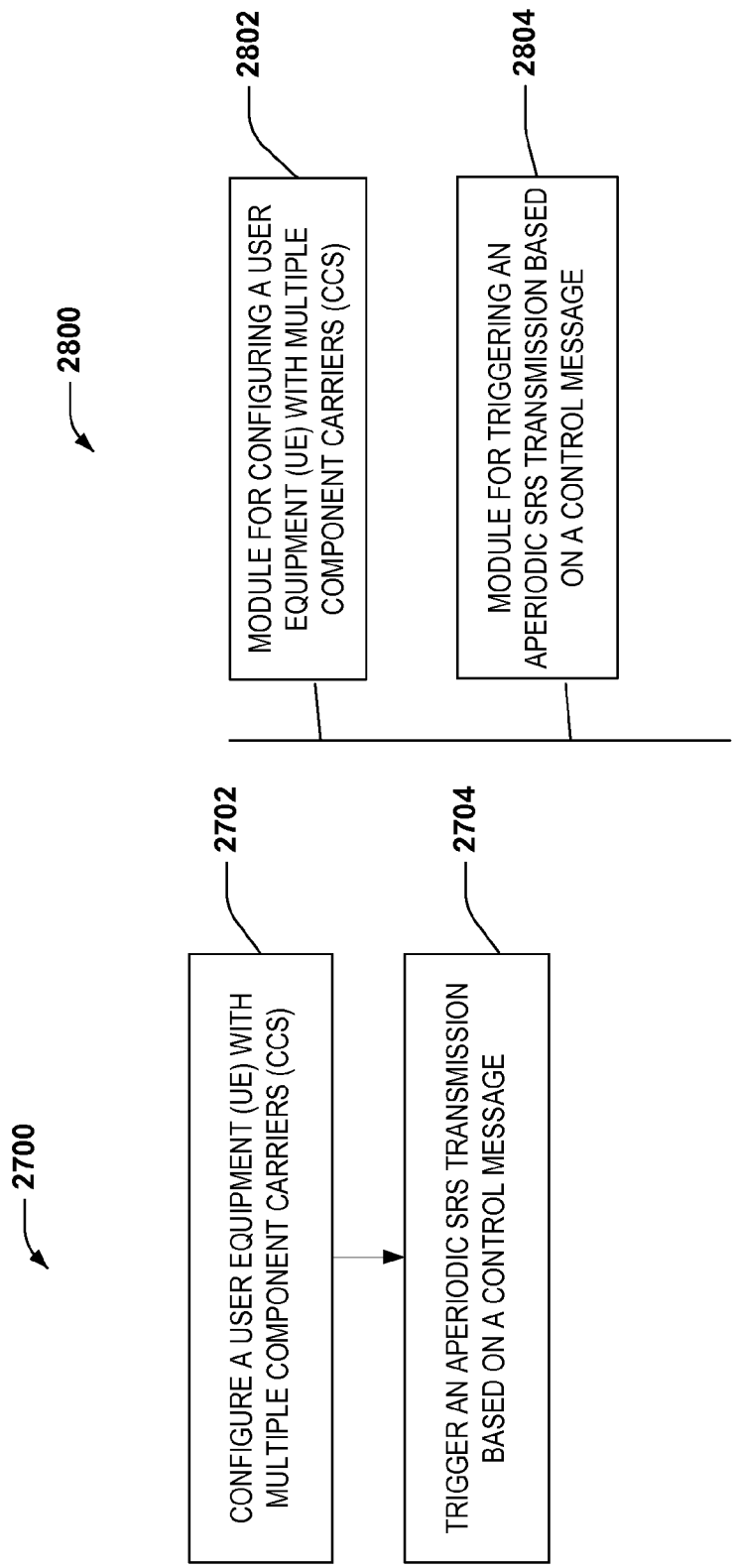

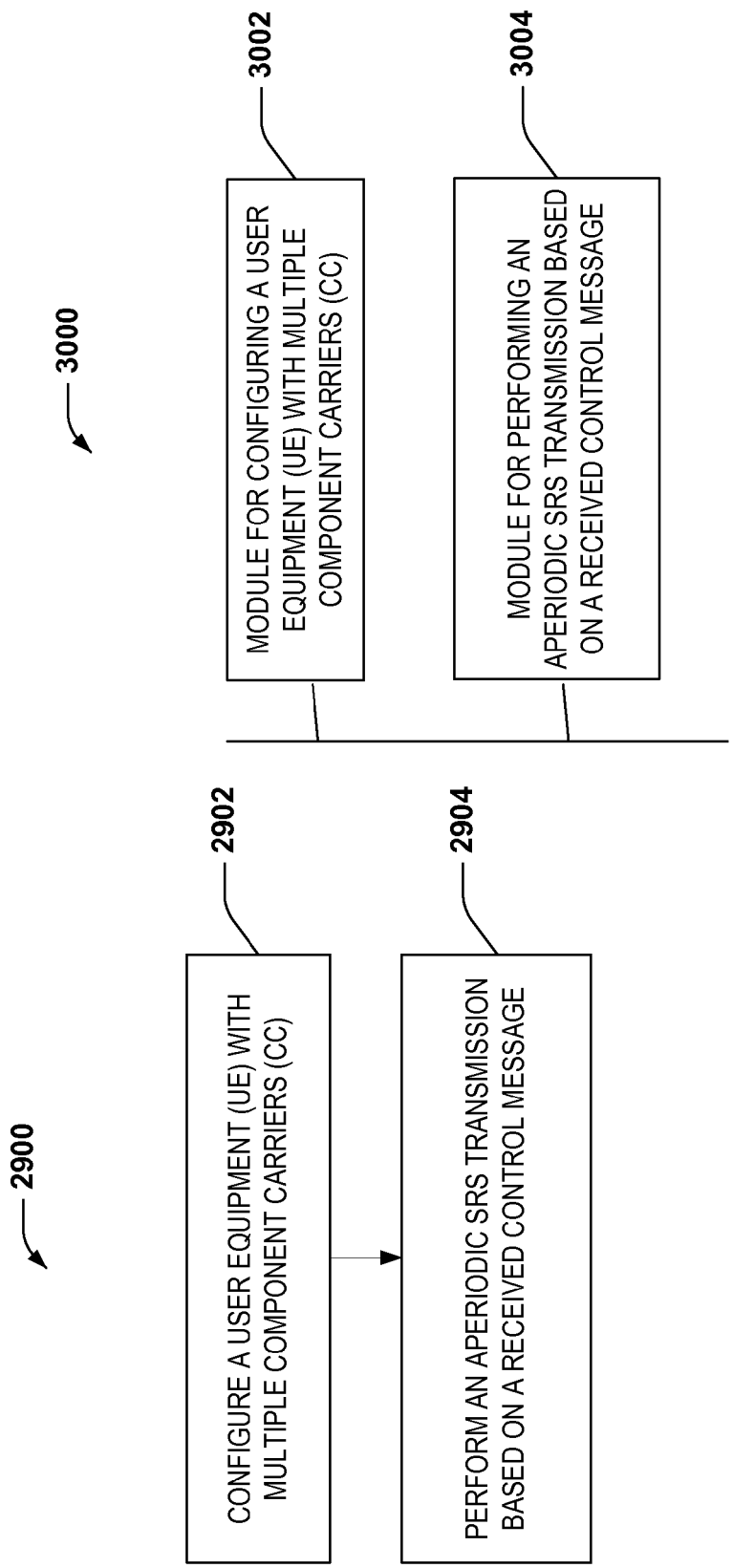

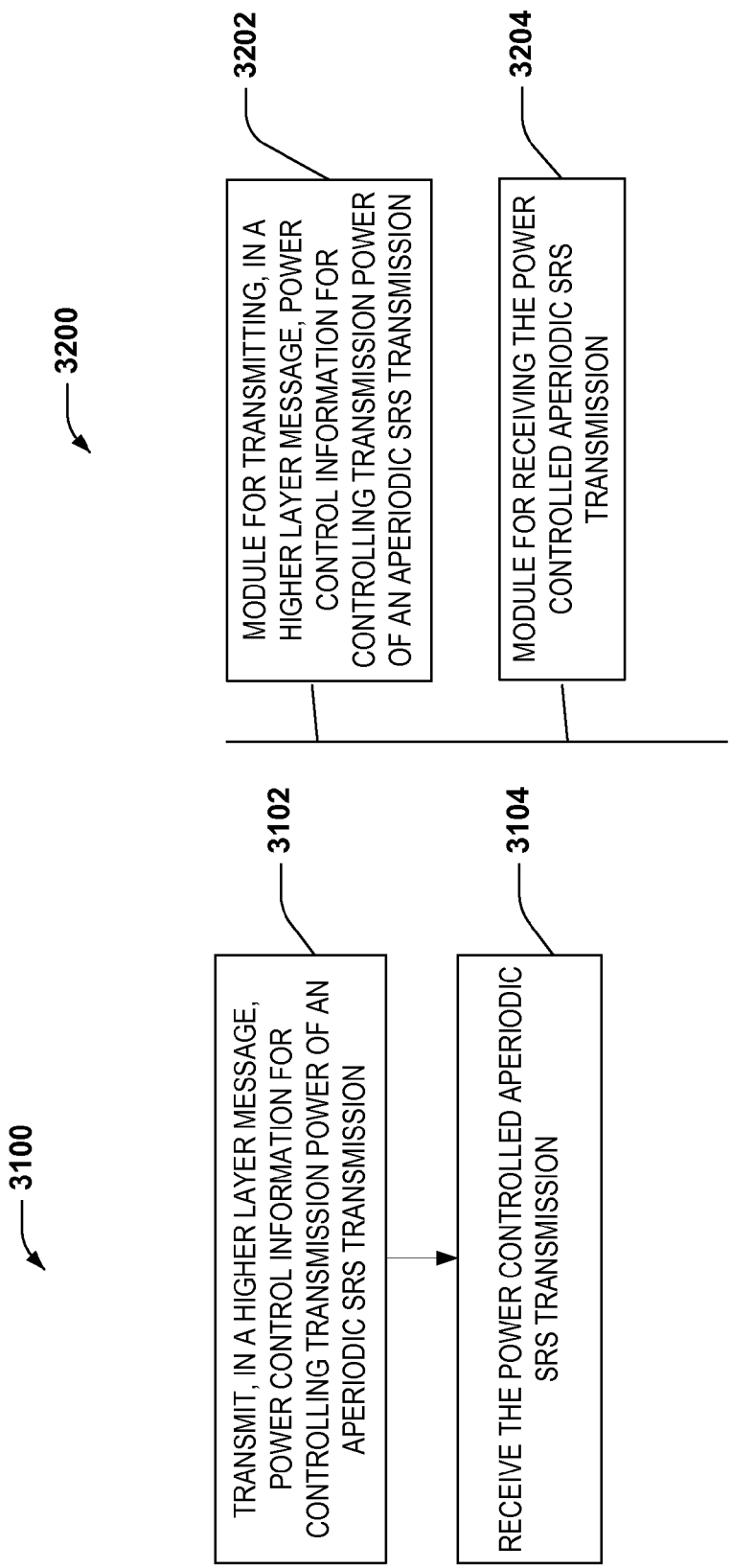

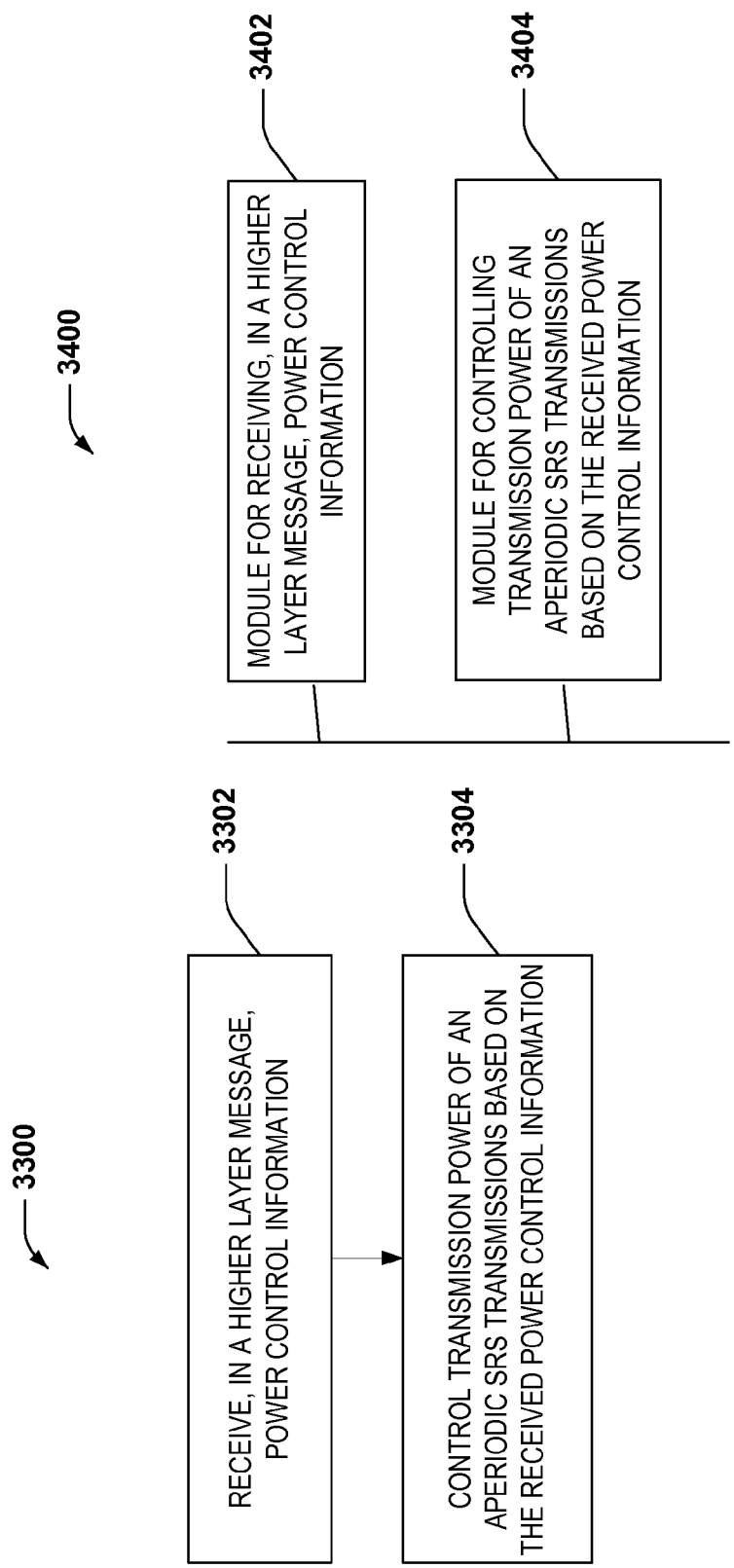

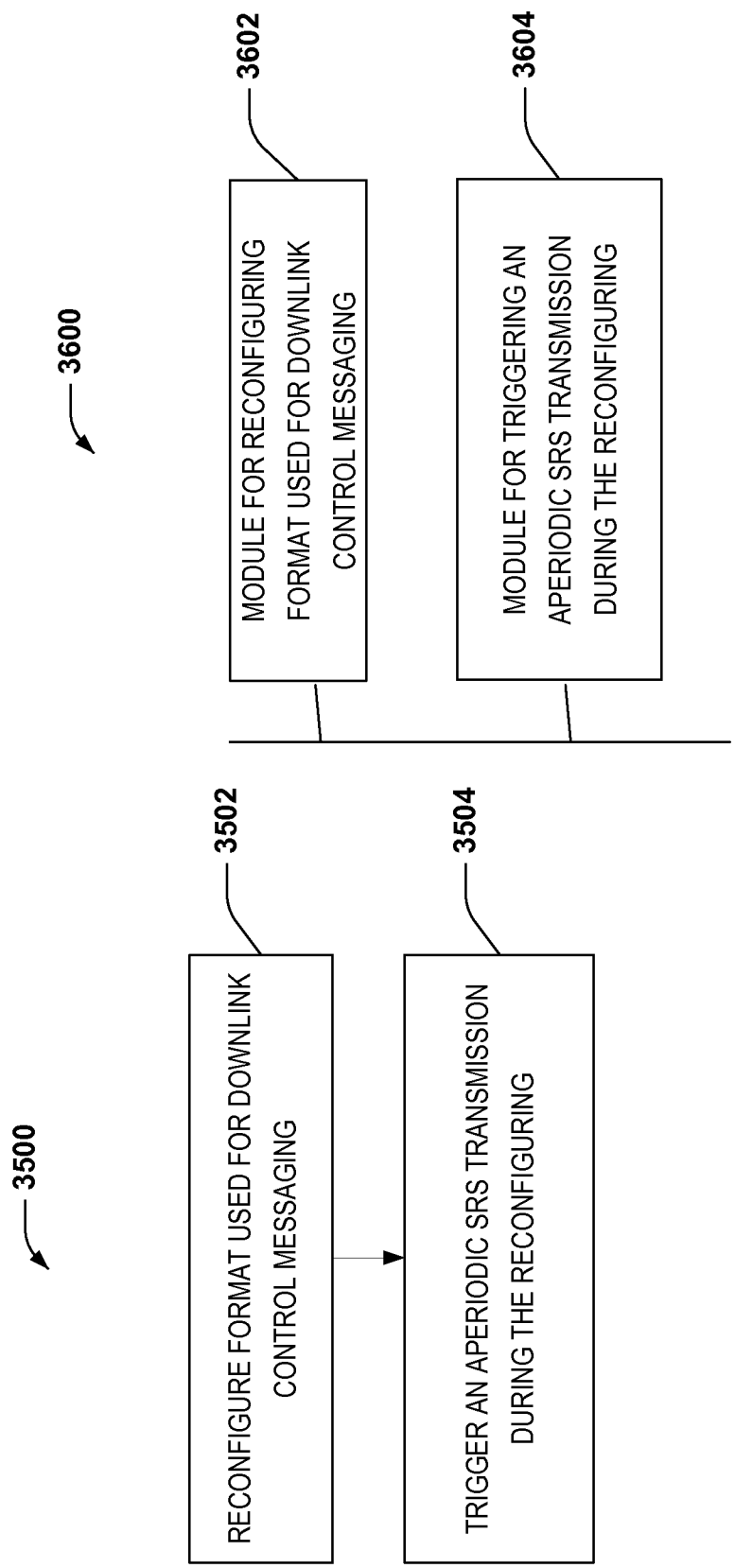

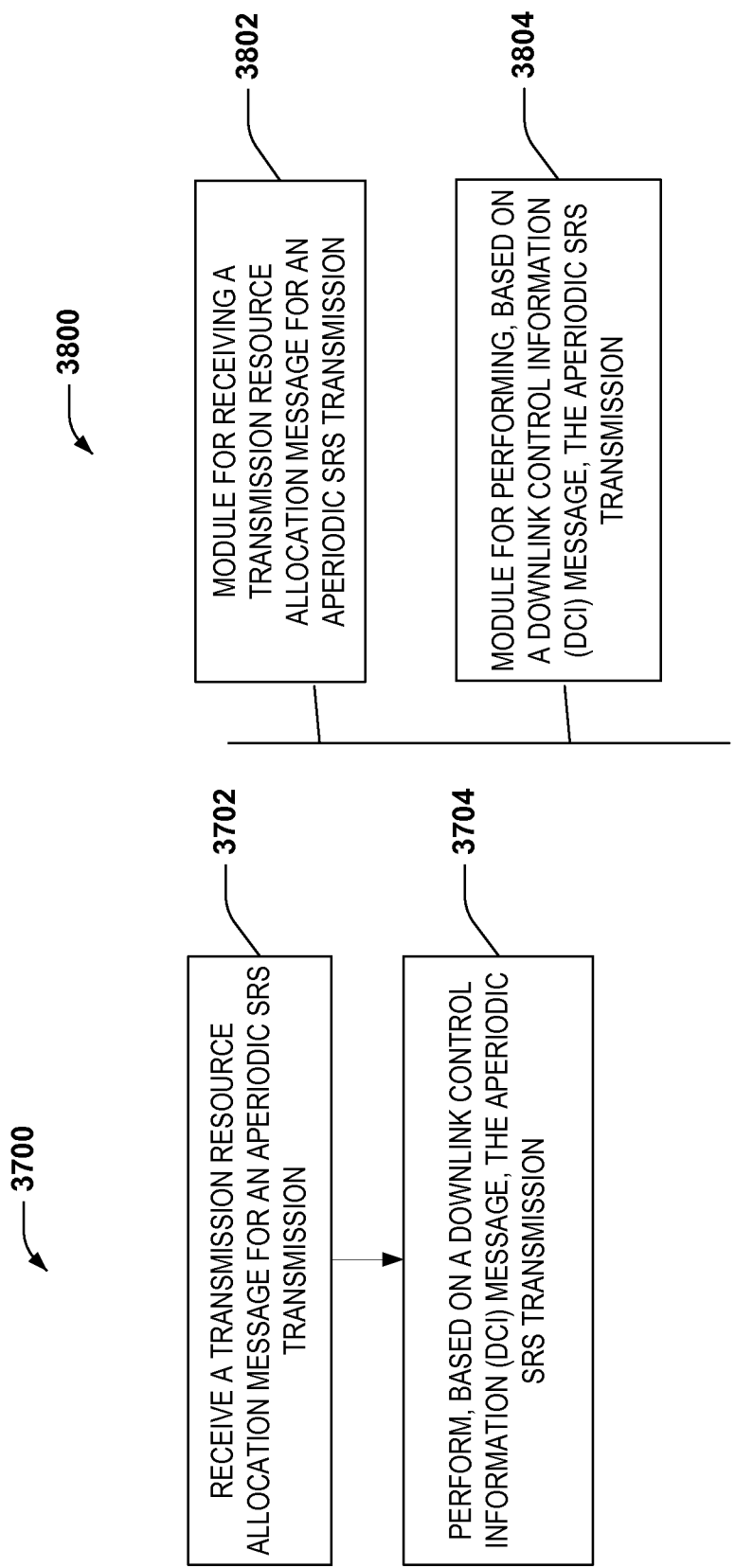

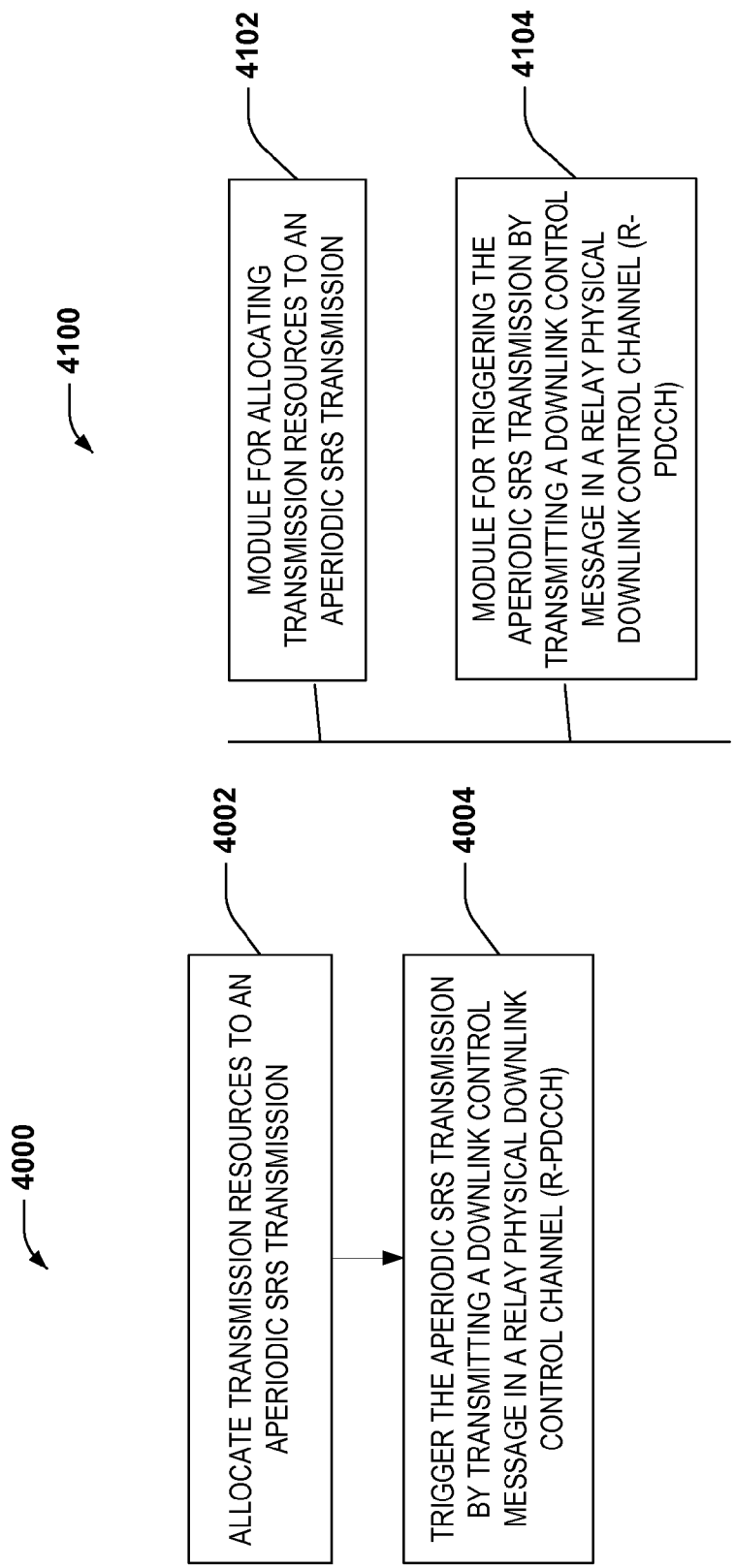

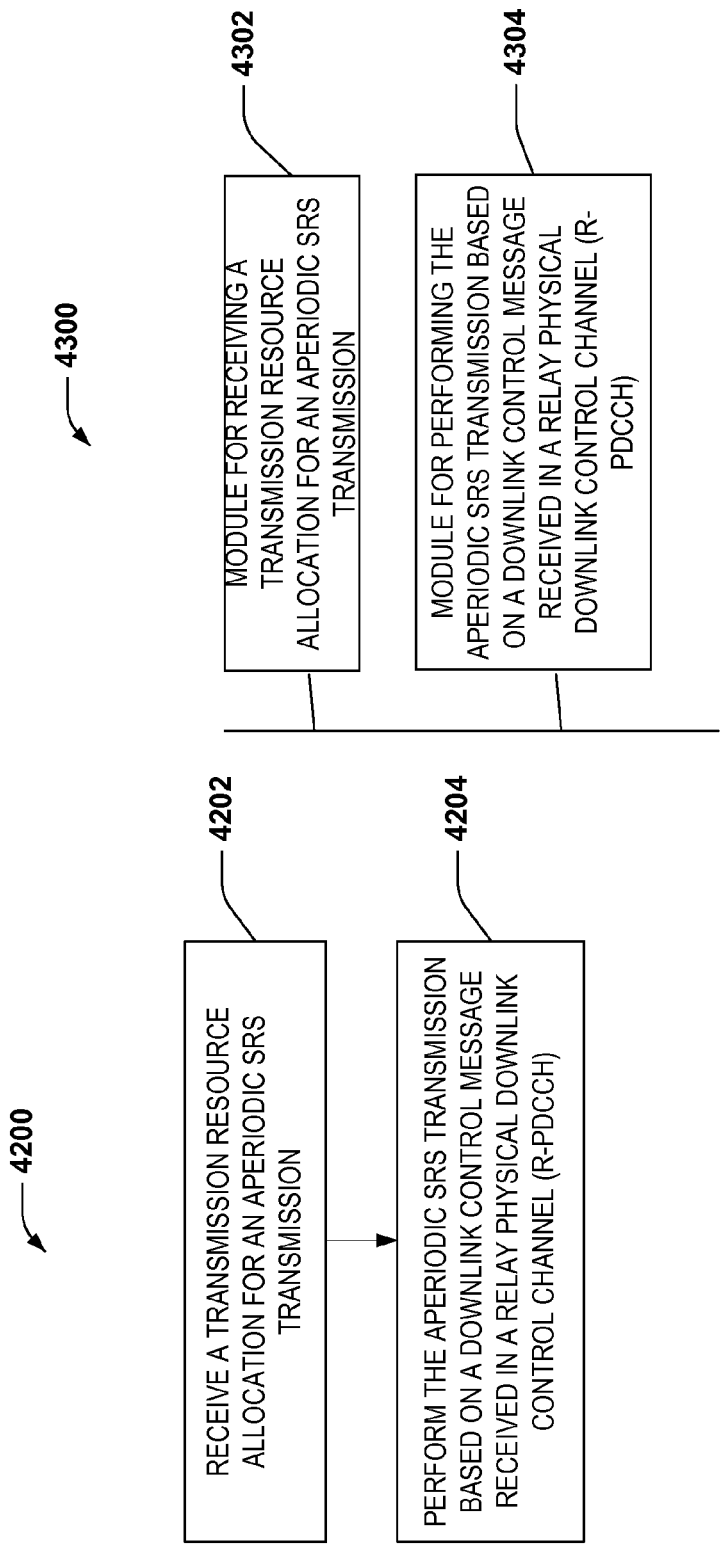

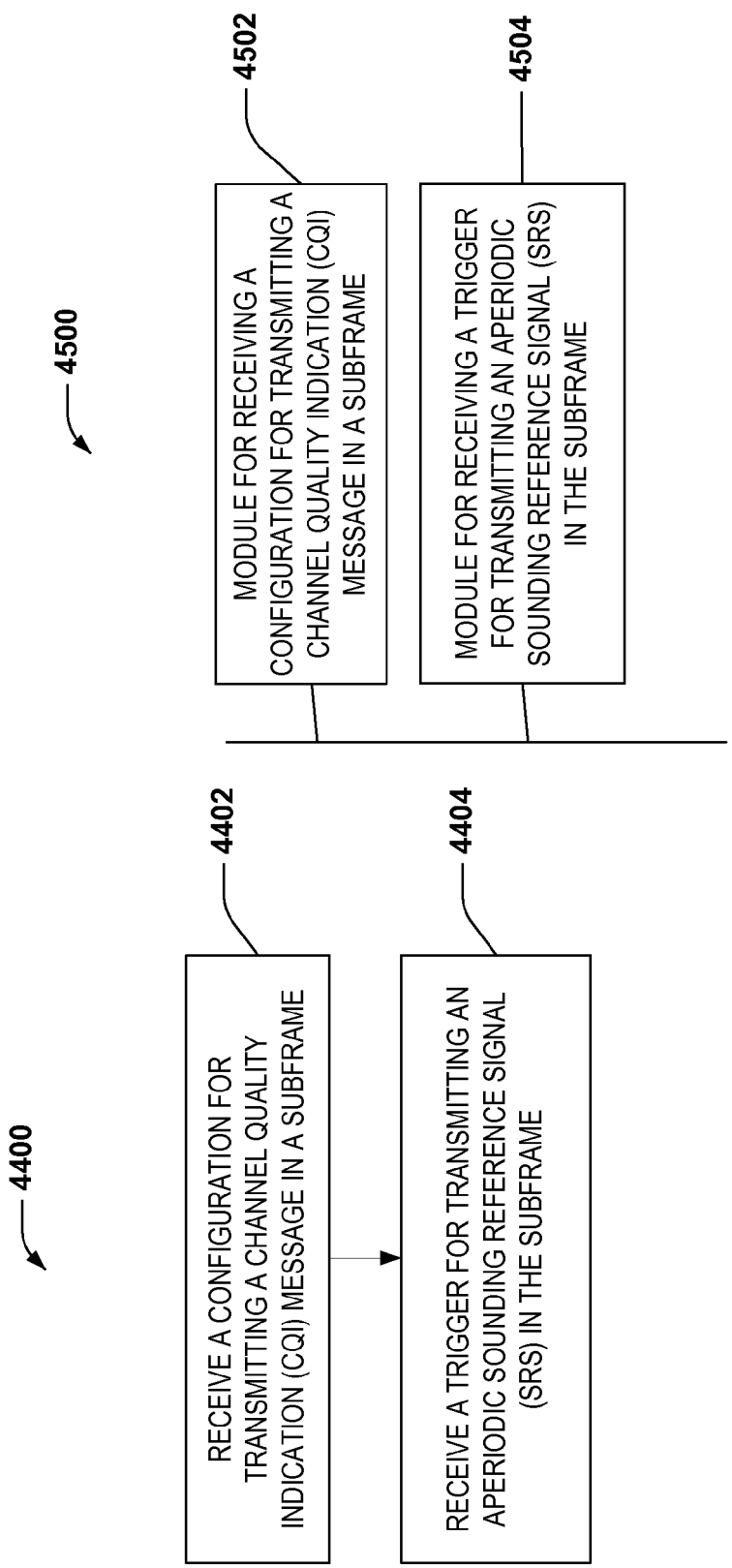

APERIODIC SOUNDING REFERENCE SIGNAL TRANSMISSION METHOD AND APPARATUS

CROSS-REFERENCE TO RELATED APPLICATIONS

This application claims the benefit of priority from U.S. Provisional Patent Application Ser. No. 61/303,244 entitled "METHOD AND APPARATUS THAT FACILITATES AN APERIODIC TRANSMISSION OF A SOUNDING REFERENCE SIGNAL" filed on Feb. 10, 2010, which is herein incorporated by reference in its entirety.

BACKGROUND

I. Field

The following description relates generally to wireless communications, and more particularly to providing resource elements for transmission of a reference signal over a channel.

II. Relevant Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals (may also be referred to as user equipments (UEs) or mobile stations). Each terminal communicates with one or more base stations via transmissions on the forward and the reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In addition, terminals can transmit sounding reference signals (SRS) to base stations, which can be utilized, for example, to determine the uplink channel quality. Base stations can utilize the SRSs in allocating uplink resources to the transmitting terminal In LTE Release 8 (Rel-8), certain parameters for transmitting SRSs, such as a maximum transmission bandwidth, available subframes, etc. related to a specific cell, can be defined during operation of a wireless network. Furthermore, terminal specific parameters, such as a configuration index of the SRS period and subframe offset for a particular mobile terminal, bandwidth for the terminal, starting resource block, frequency hopping bandwidth, transmission comb, SRS transmission duration, cyclic shift for generating the reference sequence, and/or the like can also be defined at the run time. Terminals in Rel-8 can transmit SRSs as specified by these parameters. LTE-Advanced (LTE-A) terminals can support more advanced technologies and features that can benefit from enhancements to SRS configuration.

SUMMARY

The systems and methods provided in this disclosure may meet the above discussed needs, and others. Briefly and in general terms, the disclosed designs provide methods and apparatuses for providing enhanced capabilities for transmission and allocation of SRS resources.

The following presents a simplified summary of one or more embodiments in order to provide a basic understanding of such techniques and embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In an aspect, a method for facilitating an aperiodic transmission of a sounding reference signal (SRS) includes allocating resources to the aperiodic transmission. The method further includes modifying a portion of a first downlink control message to produce a second downlink control message, where the first downlink control message does not trigger an aperiodic SRS transmission. The method further includes transmitting the second downlink message.

In another aspect, an apparatus for facilitating an aperiodic transmission of a sounding reference signal (SRS) includes means for allocating resources to the aperiodic transmission. The apparatus further includes means for modifying a portion of a first downlink control message corresponding to a first set of rules to produce a second downlink control message, where the first downlink control message does not trigger an aperiodic SRS transmission. The apparatus further includes means for transmitting the second downlink message.

In yet another aspect, an apparatus for wireless communication is disclosed. The apparatus includes a processor configured to: allocate resources to an aperiodic transmission of a sounding reference signal (SRS), modify a portion of a first downlink control message corresponding to a first set of rules to produce a second downlink control message, where the first downlink control message does not trigger an aperiodic SRS transmission, and transmit the second downlink message. The apparatus further includes memory coupled to the processor.

In yet another aspect, a computer program product comprising a computer readable storage medium is disclosed. The computer readable storage medium includes instructions for causing a computer to allocate resources to an aperiodic transmission of a sounding reference signal (SRS). The computer readable storage medium further includes instructions for causing the computer to modify a portion of a first downlink control message to produce a second downlink control message, where the first downlink control message does not trigger an aperiodic SRS transmission. The computer readable storage medium further includes instructions for causing the computer to transmit the second downlink message.

In an aspect, a method for wireless communication is disclosed. The method includes receiving a first downlink control message, where the first downlink control message is created by modifying a portion of a second downlink control message, where the second downlink control message does not trigger an aperiodic sounding reference signal (SRS) transmission and where the first downlink control message indicates resources allocated to the aperiodic SRS transmission. The method further includes transmitting an aperiodic SRS based on the received first downlink control message.

In another aspect, an apparatus for wireless communication is disclosed. The apparatus includes means for receiving a first downlink control message, where the first downlink control message is created by modifying a portion of a second downlink control message, where the second downlink control message does not trigger an aperiodic sounding reference signal (SRS) transmission and where the first downlink control message indicates resources allocated to the aperiodic SRS transmission. The apparatus further includes means for transmitting an aperiodic SRS based on the received first downlink control message.

In yet another aspect, an apparatus for wireless communication is provided. The apparatus includes a processor configured to receive a first downlink control message, where the first downlink control message is created by modifying a portion of a second downlink control message, where the second downlink control message does not trigger an aperiodic sounding reference signal (SRS) transmission and where the first downlink control message indicates resources allocated to the aperiodic SRS transmission. The processor is further configured to transmit an aperiodic SRS based on the received first downlink control message. The apparatus further includes memory coupled to the processor.

In still another aspect, a computer program product comprising a computer readable storage medium is provided. The computer readable storage medium includes instructions for causing a computer to receive a first downlink control message, where the first downlink control message is created by modifying a portion of a second downlink control message, where the second downlink control message does not trigger an aperiodic sounding reference signal (SRS) transmission and where the first downlink control message indicates resources allocated to the aperiodic SRS transmission. The computer readable storage medium further includes instructions for causing the computer to transmit an aperiodic SRS based on the received first downlink control message.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 3 is a flow chart representation of a process of facilitating an aperiodic sounding reference signal transmission.

FIG. 4 is a block diagram representation of a portion of an apparatus for facilitating an aperiodic sounding reference signal transmission.

FIG. 5 is a flow chart representation of a process of transmitting an aperiodic transmission of a sounding reference signal (SRS) in a wireless communication system.

FIG. 6 is a block diagram representation of a portion of an apparatus for transmitting an aperiodic transmission of a sounding reference signal (SRS) in a wireless communication system.

FIG. 7 is a flow chart representation of a signal reception process.

FIG. 8 is a block diagram representation of a portion of a wireless signal reception apparatus.

FIG. 11 is a flow chart representation of a process of allocating transmission resources to aperiodic sounding reference signal (SRS) transmissions in a wireless cellular communication system.

FIG. 12 is a block diagram representation of a portion of an apparatus for allocating transmission resources to aperiodic sounding reference signal (SRS) transmissions in a wireless cellular communication system.

FIG. 13 is a flow chart representation of a process of transmitting aperiodic sounding reference signals (SRS).

FIG. 14 is a block diagram representation of a portion of an apparatus for transmitting aperiodic sounding reference signals (SRS).

FIG. 15 is a flow chart representation of a process of performing aperiodic sounding reference signal (SRS) transmissions in a wireless communication network.

FIG. 16 is a block diagram representation of a portion of an apparatus for performing aperiodic sounding reference signal (SRS) transmissions in a wireless communication network.

FIG. 17 is a flow chart representation of a process for transmitting aperiodic sounding reference signals (SRS).

FIG. 18 is a block diagram representation of a portion of an apparatus for transmitting aperiodic sounding reference signals (SRS).

FIG. 25 is a flow chart representation of a signal reception process.

FIG. 26 is a block diagram representation of a portion of a signal reception apparatus.

FIG. 27 is a flow chart representation of a process of facilitating transmission of aperiodic sounding reference signals (SRS) in a wireless communication system.

FIG. 28 is a block diagram representation of a portion of an apparatus for facilitating transmission of aperiodic sounding reference signals (SRS) in a wireless communication system.

FIG. 29 is a flow chart representation of a signal transmission process.

FIG. 30 is a block diagram representation of a portion of a signal transmission apparatus.

FIG. 31 is a flow chart representation of process of receiving aperiodic sounding reference signal (SRS) transmissions in a wireless communication system.

FIG. 32 is a block diagram representation of a portion of an apparatus for receiving aperiodic sounding reference signal (SRS) transmissions in a wireless communication system.

FIG. 33 is a flow chart representation of a signal transmission process.

FIG. 34 is a block diagram representation of a portion of a signal transmission apparatus.

FIG. 35 is a flow chart representation of a process of triggering an aperiodic sounding reference signal (SRS) transmission in a wireless communication system.

FIG. 36 is a block diagram representation of an apparatus for triggering an aperiodic sounding reference signal (SRS) transmission in a wireless communication systems.

FIG. 37 is a flow chart representation of a signal transmission process.

FIG. 38 is a block diagram representation of a portion of a signal transmission apparatus.

FIG. 40 is a flow chart representation of a process of triggering an aperiodic sounding reference signal (SRS) transmission in a relay backhaul of a wireless communication network.

FIG. 41 is a block diagram representation of a portion of an apparatus for triggering an aperiodic sounding reference signal (SRS) transmission in a relay backhaul of a wireless communication network.

FIG. 42 is a flow chart representation of a signal transmission process.

FIG. 43 is a block diagram representation of a portion of a signal transmission apparatus.

FIG. 44 is a flow chart representation of a signal transmission process for use in a wireless communication system.

FIG. 45 is a block diagram representation of a portion of a signal transmission apparatus.

DESCRIPTION

Figure 1:
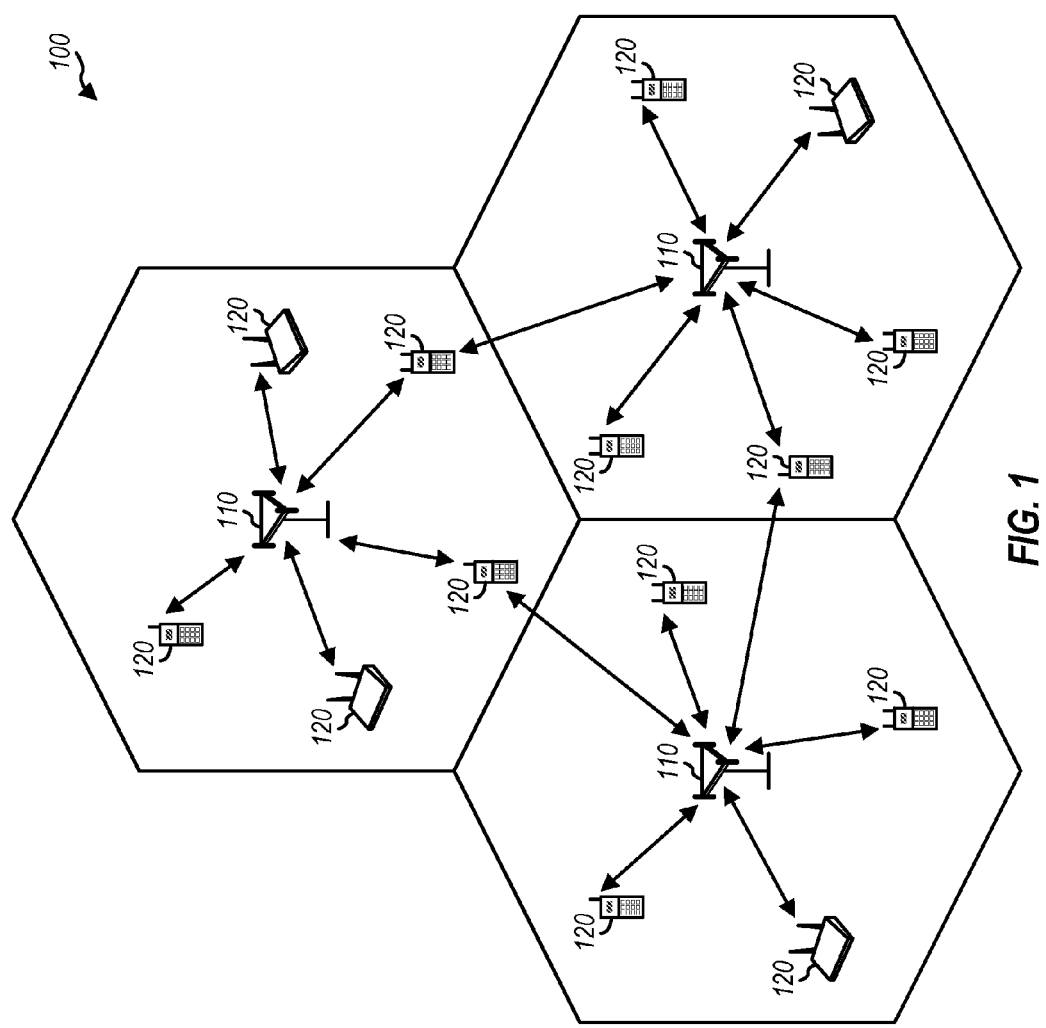
FIG. 1 illustrates a multiple access wireless communication system according to one embodiment.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as CDMA networks, TDMA networks, FDMA networks, OFDMA networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). For clarity, certain aspects of the techniques are described below for LTE, and LTE terminology is used in much of the description below.

SC-FDMA utilizes single carrier modulation and frequency domain equalization. SC-FDMA signal has lower peak-to-average power ratio (PAPR) because of its inherent single carrier structure. SC-FDMA has drawn great attention, especially in the uplink communications where lower PAPR greatly benefits the UE in terms of transmit power efficiency. It is used for uplink multiple access scheme in 3GPP LTE.

It should be noted that for the ease of explanation, the subject matter below is discussed with respect to specific examples of certain signals and message formats used in LTE and with respect to the sounding reference signal technology. However, the applicability of the disclosed techniques to other communication systems and other reference signal transmission/reception technology will be appreciated by one of skill in the art.

It has been discussed that aperiodic sounding reference signals (SRS) may possibly be introduced in LTE-A Rel-10. Several design aspects of supporting aperiodic SRS are disclosed below.

SRS are used in LTE Release 8 or Release 9 (Rel-8/9) and LTE-Advanced (LTE-A) to help improve performance of wireless communication. SRS are signals known at a base station and are transmitted by each UE using time/frequency transmission resources specified by the base station. A base station may analyze the received SRS transmissions to improve communication with the sending UE. Because SRS received from a UE are used to characterize the channel to/from the UE, ideally, the received SRS should be free from interference from transmissions by other UEs in the network (same cell or a neighboring cell). Furthermore, operational conditions, such as movement of the UE, may cause the channel to vary in time. Therefore, re-measuring the channel to overcome transmission setbacks due to such channel changes, may help improve short term channel transmission performance during such channel changes.

In LTE Rel-8 and Rel-9, periodic SRS transmission is supported. SRS may be designed as a wide-band sounding signal to facilitate uplink (UL) frequency-selective scheduling as well as other purposes such as UL power control, time tracking, etc. In time division duplexing (TDD), SRS can also be used for downlink (DL) scheduling via exploitation of channel reciprocity. In general, SRS is targeted for the serving cell and linked to physical uplink shared channel (PUSCH) power control.

Each cell may have cell-specific SRS transmission instances (up to every UL subframe) and cell-specific SRS transmission bandwidth. Typically, it is expected that cell-specific SRS bandwidth covers most of the uplink system bandwidth, excluding the physical uplink control channel (PUCCH) region. Each UE in a given cell can be configured UE-specific SRS transmission instances (within cell-specific SRS transmission instances) and UE-specific SRS transmission bandwidth, which can be as small as 4 resource blocks (RBs). SRS hopping can be enabled allowing cyclically sounding the entire or a fraction of the cell-specific SRS bandwidth. UEs in the same cell can be distinguished by different cyclic shifts of the same sequence (code division multiplexed, or CDM, up to 8), different comb levels (frequency domain multiplexed, up to 2) and different frequency starting positions (while cycling through the entire band at the cost of cycling delay), and different transmission instances (e.g., TDM).

SRS hopping sequence may be deterministic for a given set of configurations, and may be the same for all the cells under the same configurations. Different cell-specific SRS configurations among different cells may be possible to achieve SRS coordination. In LTE Rel-8, SRS hopping is performed over the entire or a portion of the cell-specific SRS bandwidth.

In LTE-A, SRS can be used for channel state information (CSI) estimation at multiple cells exploiting channel reciprocity. SRS design may need to take into account LTE-A features such as multiple transmit antennas, cooperative multi-point (CoMP), supporting heterogeneous networks, etc. There are concerns that the current SRS mechanism in Rel-8 and Rel-9 may not be sufficient for LTE-A in the following sense:

There is a tradeoff between SRS overhead/dimensioning and SRS latency, and the switch between large and small SRS latency is slow as such switching is typically achieved via layer 3 reconfiguration. Such an approach may not be particularly effective for bursty packet arrivals.

In LTE Rel-8 and Rel-9, both periodic and aperiodic channel quality indicator (CQI)/precoding matrix index (PMI)/rank indicator (RI) reporting schemes are supported. Periodic CQI reporting is layer-3 configured with a UE-specific reporting periodicity. Aperiodic CQI reporting is layer 2 driven, via a single bit embedded in DCI format 0. Once enabled, the aperiodic CQI report is transmitted either along with PUSCH transmissions, or by itself using the PUSCH resource. This aperiodic reporting provides an efficient way for a one-time, quick, and detailed (as it uses PUSCH resources) channel information feedback.

The present disclosure introduces aperiodic SRS in LTE-A to increase SRS utilization efficiency, in which mechanisms for triggering aperiodic SRS transmissions via a message from a base station to a UE, and conversely transmitting aperiodic SRS transmissions from the UE to the base station, are provided in addition to other aspects.

FIG. 1 shows a wireless communication system 100, which may be an LTE system or some other system. System 100 may include a number of evolved Node Bs (eNBs) 110 and other network entities. An eNB 110 may be an entity that communicates with UEs 120 and may also be referred to as a base station, a Node B, an access point, etc. Each eNB 110 may provide communication coverage for a particular geographic area and may support communication for the UEs 120 located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

UEs 120 may be dispersed throughout the system 100, and each UE 120 may be stationary or mobile. A UE 120 may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

LTE utilizes orthogonal frequency division multiplexing (OFDM) on the downlink and single-carrier frequency division multiplexing (SC-FDM) on the uplink. OFDM and SC-FDM partition a frequency range into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 mega-Hertz (MHz), respectively. The system bandwidth may correspond to a subset of the K total subcarriers.

Figure 2:
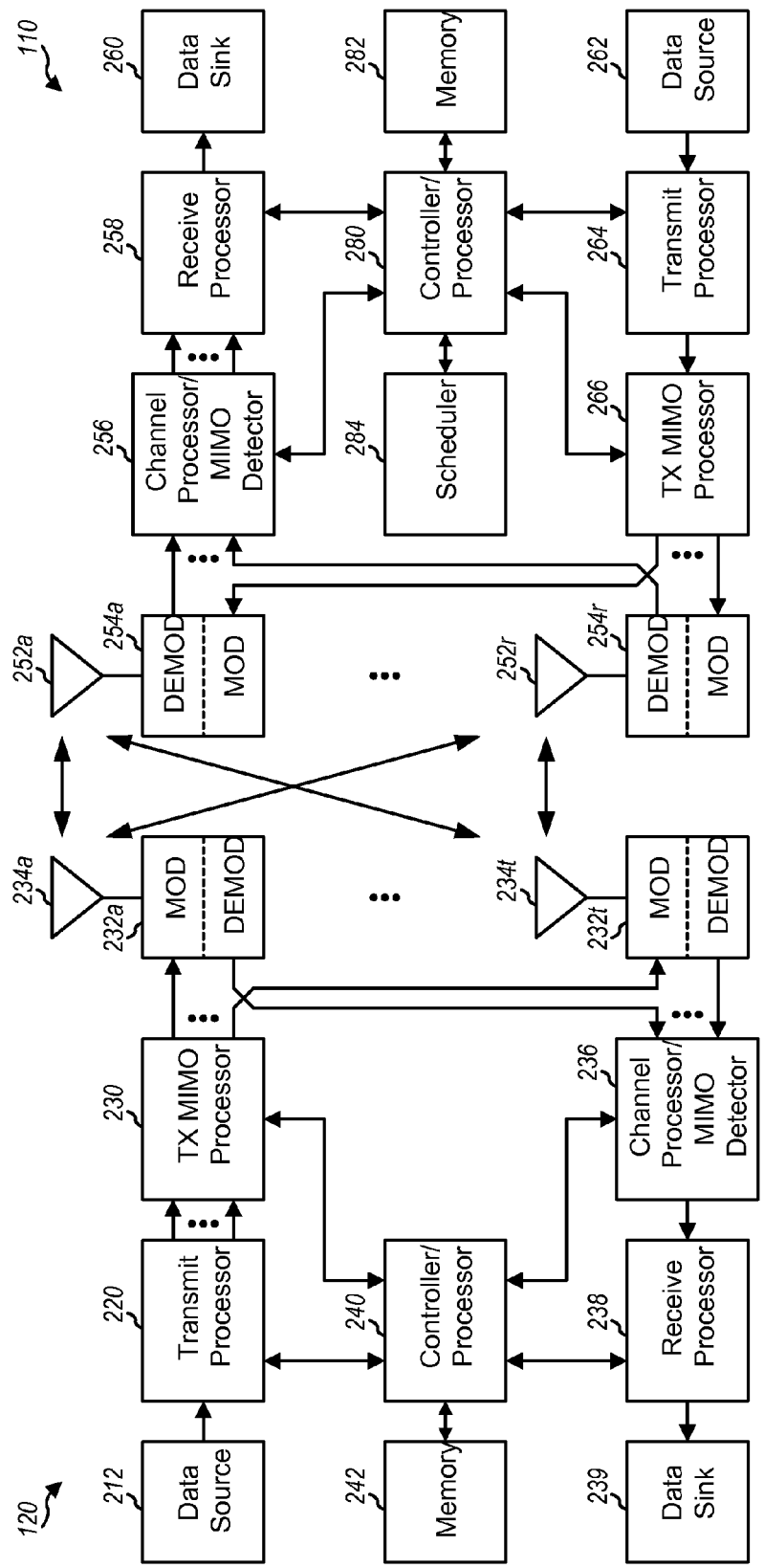
FIG. 2 illustrates a block diagram of a communication system.

FIG. 2 shows a block diagram of an exemplary base station 110 and a UE 120, which may be one of the eNBs and one of the UEs in FIG. 1, respectively, where the various processes disclosed above may be implemented, as appropriate. The UE 120 may be equipped with T antennas 234a through 234t, and the base station 110 may be equipped with R antennas 252a through 252r, where in general T≥1 and R≥1.

At the UE 120, a transmit processor 220 may receive data from a data source 212 and control information from a controller/processor 240. Transmit processor 220 may process (e.g., encode, interleave, and symbol map) the data and control information and may provide data symbols and control symbols, respectively. Transmit processor 220 may also generate one or more demodulation reference signals for multiple non-contiguous clusters based on one or more reference signal (RS) sequences assigned to UE 120 and may provide reference symbols. A transmit (TX) multiple-input multiple-output (MIMO) processor 230 may perform spatial processing (e.g., precoding) on the data symbols, the control symbols, and/or the reference symbols from transmit processor 220, if applicable, and may provide T output symbol streams to T modulators (MODs) 232a through 232t. Each modulator 232 may process a respective output symbol stream (e.g., for SC-FDMA, etc.) to obtain an output sample stream. Each modulator 232 may further process (e.g., convert to analog, amplify, filter, and upconvert) the output sample stream to obtain an uplink signal. T uplink signals from modulators 232a through 232t may be transmitted via T antennas 234a through 234t, respectively.

At the base station 110, antennas 252a through 252r may receive the uplink signals from the UE 120 and provide received signals to demodulators (DEMODs) 254a through 254r, respectively. Each demodulator 254 may condition (e.g., filter, amplify, downconvert, and digitize) a respective received signal to obtain received samples. Each demodulator 254 may further process the received samples to obtain received symbols. A channel processor/MIMO detector 256 may obtain received symbols from all R demodulators 254a through 254r. Channel processor 256 may derive a channel estimate for a wireless channel from the UE 120 to the base station 110 based on the demodulation reference signals received from UE 120. MIMO detector 256 may perform MIMO detection/demodulation on the received symbols based on the channel estimate and may provide detected symbols. A receive processor 258 may process (e.g., symbol demap, deinterleave, and decode) the detected symbols, provide decoded data to a data sink 260, and provide decoded control information to a controller/processor 280.

On the downlink, at the base station 110, data from a data source 262 and control information from controller/processor 280 may be processed by a transmit processor 264, precoded by a TX MIMO processor 266 if applicable, conditioned by modulators 254a through 254r, and transmitted to the UE 120. At the UE 120, the downlink signals from the base station 110 may be received by antennas 234, conditioned by demodulators 232, processed by a channel estimator/MIMO detector 236, and further processed by a receive processor 238 to obtain the data and control information sent to the UE 120. Processor 238 may provide the decoded data to a data sink 239 and the decoded control information to controller/processor 240.

Controllers/processors 240 and 280 may direct the operation at the UE 120 and base station 110, respectively. Processor 220, processor 240, and/or other processors and modules at the UE 120 may perform or direct process 1400 in FIG. 14 and/or other processes for the techniques described herein. Processor 256, processor 280, and/or other processors and modules at the base station 110 may perform or direct process 1200 in FIG. 12 and/or other processes for the techniques described herein. Memories 242 and 282 may store data and program codes for the UE 120 and base station 110, respectively. A scheduler 284 may schedule UEs for downlink and/or uplink transmission and may provide allocations of resources (e.g., assignment of multiple non-contiguous clusters, RS sequences for demodulation reference signals, etc.) for the scheduled UEs.

To help with the above-discussed UL link adaptation, in some designs, aperiodic CQI reporting may be triggered using a bit in a downlink control message. For example, in Rel-8 and Rel-9, an aperiodic CQI triggering bit is present only in DCI format 0. One reason for using the DCI format 0 is because aperiodic CQI transmission relies on PUSCH resources (and not PUCCH resources), and DCI format 0 is the only DCI format scheduling PUSCH transmissions.

In some designs, SRS transmissions may not only be useful for UL link adaptation, but may also be used for DL link adaptation. For example, a TDD system may exploit the symmetrical nature of a TDD channel and perform DL link adaptation using SRS transmissions.

Therefore, in some designs, the aperiodic SRS triggering bit (or bits) may not be limited to DCI formats scheduling PUSCH transmissions (e.g., DCI format 0 and any new DCI formats to be introduced in Rel-10 or later releases). In such designs, the aperiodic SRS triggering bit may be present in downlink messages scheduling physical downlink shared channel (PDSCH) transmissions. (e.g., DCI formats scheduling PDSCH transmissions). In some designs, the SRS triggering bit may be reserved for SRS activation/release, as further described below. It is understood that while the term "triggering bit" is used is the present specification for ease of explanation, such a triggering message may comprise one or more contiguous or non-contiguous bits of a downlink control message (e.g., a single bit, 2 bits, etc.).

For example, in Rel-8/Rel-9, aperiodic CQI may be triggered using message 2 (e.g., random access response (RAR) grant). In some designs, aperiodic SRS may be enabled in an RAR grant as well. In some designs, the aperiodic SRS may be achieved by using a new bit in the RAR grant message. In some designs one of the existing bits in RAR grant may be re-used for triggering aperiodic SRS transmissions. For instance, the aperiodic CQI report triggering bit can be re-interpreted (either via a higher layer configuration or by a priori decision) such that when the bit is set, both aperiodic CQI and aperiodic SRS transmissions are triggered simultaneously. While both these transmissions may be triggered using the same bit, the transmission timing and/or bandwidth used for CQI and SRS may in general be different.

In some designs, an aperiodic SRS may be transmitted using physical layer resources and characteristics similar to periodic SRS transmissions in Rel-8 and Rel-9. For example, the last symbol of a subframe may be used for the aperiodic SRS transmissions. The selection of transmission bandwidth is discussed further below.

In some designs, new fields carrying aperiodic SRS triggering and specifying certain characteristics and resources allocated to the SRS transmissions may be introduced within existing DL and/or UL DCI formats. As discussed above, in some designs, aperiodic SRS may be triggered via an RAR grant (message 2). In one aspect, the introduction of the new fields may be such that the modified DCI formats may now be able to trigger aperiodic SRS transmissions, which was previously not possible with these DCI formats.

In some designs, the new downlink control message may have the same size and PHY characteristics as an existing downlink control message format. Such same-sizing may minimize the need to perform blind detection at a UE for receiving the new message. In some designs, fields in the new DCI may be used to indicate various characteristics of the aperiodic SRS, such as bandwidth, location, timing, identification of UL antenna to be used for the aperiodic SRS transmission, etc.

Alternatively, in some designs, "invalid combinations" of bits in a conventional transmission standard (e.g., Rel-8 or Rel-9) in the existing downlink message formats may be used to trigger aperiodic SRS transmissions. In one aspect, such invalid combinations may be ignored by conventional UEs, but processed meaningfully by UEs that comply with the aperiodic SRS techniques disclosed herein. As an example, in Rel-8/Rel-9 DCI formats, some field(s) have certain restrictions. For example, allowed resource allocation for UL in conventional techniques have to be multiples of 2, 3, or 5 (RBs). In some methods, a UE may be signaled using UL DCI format(s) indicating resource allocations that are NOT multiples of 2/3/5 to indicate aperiodic SRS triggering. In some designs, reserved or unused bits from DCI formats may be used for aperiodic SRS transmission triggering. In some designs, as explained above, certain combinations of bit values in DCI messages, not allowed in Rel-8 and Rel-9, may be used for triggering aperiodic SRS transmissions.

In some designs, multiple unused entries or multiple un-allowed combination of bit values may be used to specify various characteristics of aperiodic SRS transmissions (e.g., bandwidth, periodicity, resource element assignments, etc.). It will be appreciated that such a use of unused or un-allowed bit combinations is generally applicable to all current and future formats.

In some designs, higher layer signaling (e.g., layer 3 signaling) may be used to define and/or reserve some combinations in downlink control messages, and use them to indicate SRS triggering. For example, during the admission of a UE to the network or intermittently during the operation of the UE, a higher layer message may be communicated to the UE conveying the operational parameters of aperiodic SRS transmissions.

In some designs, the above-discussed aperiodic SRS triggering techniques A potential variation is to enable the SRS triggering bit only in some DL message formats, e.g., DCI format 1A (matching DCI format 0 and DCI format 1A in size).

In the description below, for convenience, the following notation is used.

DL DCI: DCI which schedules PDSCH transmission and may trigger aperiodic SRS (in general, a downlink control message that schedules a downlink transmission).

UL DCI: DCI which schedules PUSCH transmission and may trigger aperiodic SRS (in general, a downlink control message that schedules an uplink transmission).

SRS DCI: DCI only for the purpose of triggering aperiodic SRS. i.e., no PDSCH or PUSCH transmission is scheduled (in general, a downlink control message dedicated to triggering of aperiodic SRS transmissions.

In general, in a given transmission subframe, multiple messages, any of which could trigger an aperiodic transmission, may be included (e.g., UL, DL and SRS DCI messages). In some designs, UEs may be configured such that one of these multiple messages may take precedence over the others. In some designs, some or all of the messages may be used to define various characteristics of aperiodic transmissions (e.g., different bandwidths, different antennas, etc.).

FIG. 3 is a flow chart representation of a method 300 of facilitating an aperiodic transmission of SRS. At 302, transmission resources may be allocated to the aperiodic SRS transmission. The eNB may assign the transmission resources based on pre-determined rules and/or run-time operational needs of a particular channel. At 304, a portion of a first downlink control message corresponding to a set of rules (e.g., Rel-8 or Rel. 9) may be modified to produce a second downlink control message. The first downlink control message does not trigger the aperiodic SRS transmission. At 306, the second downlink message may be transmitted. In some designs, at least some of the allocated transmission resources may be indicated in a downlink control message using a message control field. As discussed above, in some designs, the downlink control message may be a newly defined control message or may re-use some unused or un-defined combinations of bit values in an existing message. For example, the downlink control message may be a DCI message defined in the Rel-8 or the Rel-9 specification. The message field may be selected to have the same length as an existing message field. In some designs, the resource allocation may simply trigger a subsequent transmission of an aperiodic SRS from a UE (i.e., no additional resource allocations may be explicitly signaled). In some designs, the message field may be one or two bit wide. As discussed further below, an aperiodic SRS transmission may be received after a pre-determined time period after the transmission of the downlink control message.

FIG. 4 is a block diagram representation 400 of a portion of an eNB (such as the eNB 110 in FIG. 1) configured for facilitating an aperiodic transmission of SRS. A module 402 is provided for allocating transmission resources to the aperiodic SRS transmission (e.g., a processor). A module 404 is provided for modifying a portion of a first downlink control message (e.g., a DCI message in Rel-8 or Rel-9) corresponding to a first set of rules (e.g., Rel-8 or Rel-9) to produce a second downlink control message such as a newly defined DCI message for LTE-A (e.g., a modifier). The first downlink control message does not trigger an aperiodic SRS transmission. A module 406 is provided for transmitting the second downlink message (e.g., a transmitter).

FIG. 5 is a flow chart representation of a method 500 of transmitting an aperiodic SRS transmission. At 502, a first downlink control message may be received, wherein the first downlink control message is created by modifying a portion of a second downlink control message corresponding to a set of rules, where the second downlink control message does not trigger an aperiodic SRS transmission and wherein the first downlink control message indicates a subset of transmission resources allocated to the aperiodic SRS transmission. At 504, an aperiodic SRS based on the received first downlink control message may be transmitted. As discussed above, in some designs, the received first downlink control message comprises a downlink random access response (RAR) message. The portion of the second field may include a one or a two bit field. In some designs, the UE may transmit the aperiodic transmission after a pre-determined time period (e.g., 4 milliseconds or more) after receiving the second downlink control message.

FIG. 6 is a block diagram representation 600 of a portion of a UE (such as the UE 120 in FIG. 1) for performing an aperiodic SRS transmission. A module 602 is provided for receiving (e.g., using a receiver) a first downlink control message, wherein the first downlink control message is created by modifying a portion of a second downlink control message corresponding to a set of rules, where the second downlink control message does not trigger an aperiodic SRS transmission and wherein the first downlink control message indicates a subset of transmission resources allocated to the aperiodic SRS transmission. A module 604 is provided transmitting (e.g., using a transmitter) an aperiodic SRS based on the received first downlink control message.

In some designs that use an UL DCI message for triggering an aperiodic SRS transmission, the SRS transmission subframe may be the same as that of the corresponding PUSCH subframe for which the UL DCI message schedules transmissions.

In some designs that use an UL DCI message for triggering an aperiodic SRS transmission, the aperiodic SRS transmission may be scheduled during the first available cell-specific SRS opportunity after the corresponding PUSCH subframe scheduled by the UL DCI message, or may have some other fixed relationship between the PUSCH timing and SRS timing. For example, in some designs, a fixed delay (e.g., 4 milliseconds or more) may be defined between the PUSCH subframe and the SRS transmission. The fixed delay may provide both the eNB and the UE with sufficient time to prepare for the subsequent reception/transmission of the aperiodic SRS transmission.

In some designs, aperiodic SRS transmissions may be abstained from message 3 transmissions. In one aspect, because periodic SRS transmissions may not be transmitted together with message 2, such abstaining helps avoid any potential conflicts at a transmitter or a receiver.

In some designs that use a DL DCI message for triggering an aperiodic SRS transmission, the corresponding subframe for aperiodic SRS transmission may be the same as that of the UL ACK/NAK subframe. In some designs, either shortened PUCCH format may be used or waveform relaxation may be enabled to support the aperiodic SRS transmission.

In some designs that use a DL DCI message for triggering an aperiodic SRS transmission, the corresponding SRS transmission may be scheduled for the first available cell-specific SRS opportunity after the ACK/NAK subframe, or have some other fixed relationship between the ACK/NAK timing and the SRS timing. For example, in some designs, a fixed delay (e.g., 4 milliseconds or more) may be defined between the ACK/NAK subframe and the SRS transmission. The fixed delay may provide both the eNB and the UE with sufficient time to prepare for the subsequent reception/transmission of the aperiodic SRS transmission.

In some designs that use an SRS DCI message for triggering an aperiodic SRS transmission, the corresponding SRS transmission may be scheduled depending on the nature of the SRS DCI used. For example, in some designs, when the SRS DCI has a format similar to an existing DL or UL DCI format, the previously discussed UL/DL DCI rules may apply. In some designs, when a new DCI format is used, aperiodic SRS transmission may be scheduled for the first available cell-specific SRS opportunity or a fixed delay (e.g., 4 milliseconds or greater) after the transmission of the SRS DCI message.

In conventional wireless networks, such as Rel-8 and Rel-9, periodic CQI/PMI/RI and SRS cannot be transmitted simultaneously. When the scheduled transmission times for both these transmissions overlap in a subframe, only the periodic CQI/PMI/RI may be transmitted in that subframe. However, aperiodic CQI/PMI/RI and SRS may be transmitted simultaneously. In such transmissions, the CQI/PMI/RI transmission is piggybacked on PUSCH, and the periodic SRS transmission punctures the last symbol of the subframe.

In Rel-10, parallel PUCCH and PUSCH transmissions may be allowed. However, there does not presently exist a way to simultaneously transmit CQI/PMI/RI reporting and aperiodic SRS transmissions. In some designs as discussed below, simultaneous transmission of periodic CQI and aperiodic SRS is made possible.

In some designs that use the DL or SRS DCI for triggering an aperiodic SRS transmission, when the single-carrier (SC) waveform is required in a given subframe, for a given UE, aperiodic SRS may not be triggered in the same subframe as a periodic CQI/PMI/RI. On the other hand, when relaxed SC waveform is allowed in the given subframe, for a given UE, aperiodic SRS may be triggered and transmitted along with periodic CQI/PMI/RI in the same subframe. In designs that support two or more power amplifiers (PA), one PA may be used to transmit the CQI/PMI/RI report, while another PA may be used to transmit the aperiodic SRS transmission. In some designs, when the transmit power limitation limits the transmission to either CQI/PMI/RI report or SRS, then the transmission of SRS may be given priority over the transmission of the CQI/PMI/RI report due the event-sensitive nature of the SRS transmissions. Such a prioritization is different from conventional systems, e.g., Rel-8, where CQI/PMI/RI reporting has a higher priority over periodic SRS transmissions.

In some designs that trigger the transmission of aperiodic SRS using an UL DCI message, aperiodic CQI/PMI/RI and aperiodic SRS may be triggered simultaneously in one subframe.

FIG. 7 is a flow chart representation of a method 700 of receiving signals in a wireless communication system. At 702, a channel quality indicator (CQI) such as the above-discussed CQI/PMI/RI message, may be received in a subframe of a transmission. At 704, an aperiodic SRS may be received in the same subframe of the transmission.

FIG. 8 is a block diagram representation 800 of a portion of an eNB (such as the eNB 110 in FIG. 1) for receiving signals in a wireless communication system. A module 802 is provided for receiving a CQI message in a subframe of transmission. A module 804 is provided for receiving an aperiodic SRS in the same subframe of transmission.

Figures 9, 10:
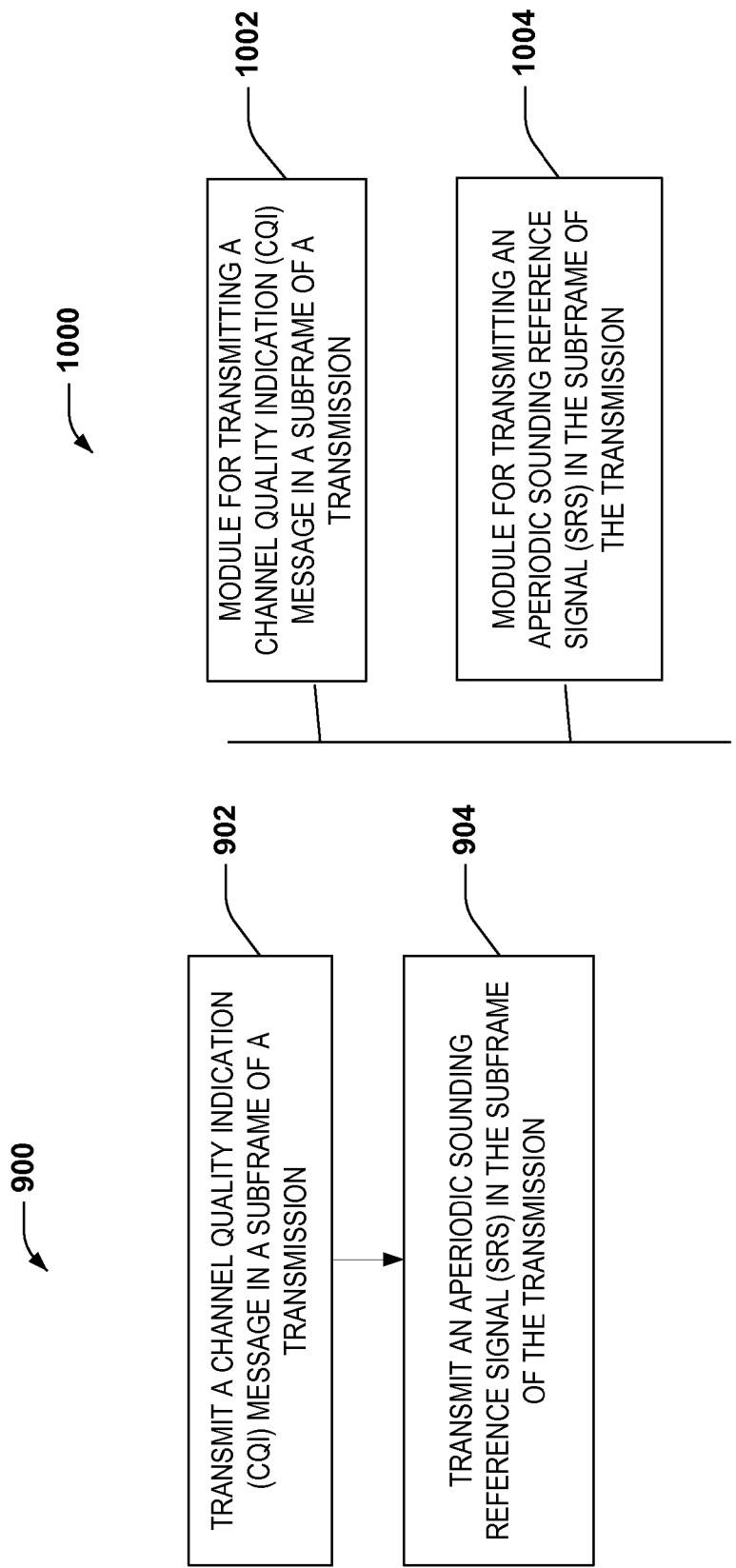
FIG. 9 is a flow chart representation of a process of transmitting aperiodic sounding reference signal (SRS) transmissions in a wireless cellular communication system.
FIG. 10 is a block diagram representation of a portion of an apparatus for transmitting aperiodic sounding reference signal (SRS) transmissions in a wireless cellular communication system.

FIG. 9 is a flow chart representation of a method 900 of transmitting signals in a wireless communication system. At 902, a channel quality indicator (CQI) message may be transmitted in a subframe of a transmission. At 904, an aperiodic sounding reference signal (SRS) may be transmitted in the same subframe of the transmission. As discussed above, in some designs, the aperiodic SRS transmission may be given priority over the CQI/PMI/RI transmission.

FIG. 10 is a block diagram representation of a portion of a UE (such as the UE 120 in FIG. 1) for receiving signals in a wireless communication system. A module 1002 may be provided for transmitting a channel quality indicator (CQI) message in a subframe of transmission. A module 1004 may be provided for transmitting a channel quality indicator (CQI) message in a subframe of transmission.

In some designs, cell-specific SRS configurations (e.g., bandwidth used and subframes used for transmissions) indicate to UEs how to transmit upstream transmissions such as PUCCH and PUSCH. In particular, in cell-specific SRS subframes, when shortened PUCCH format is configured, shortened PUCCH format may always be used, regardless of whether the UE transmits SRS or not. Also, in cell-specific SRS subframes, if the resources allocated for PUSCH collide (even partially) with the cell-specific SRS bandwidth, or if the UE also transmits SRS, the last symbol may be punctured and may not used for the PUSCH transmission.

For some designs, for the aperiodic SRS transmission, it may be assumed that once triggered by the eNB, the eNB does not expect the SRS to be dropped. With this mind, we take a look at the impact on PUSCH and PUCCH operations separately.

In some designs in which the aperiodic SRS bit is included in the UL DCI, aperiodic SRS may be transmitted along with PUSCH. The last symbol is used for SRS (except in the case of TDD pilot slots or UpPTS,). However, when the subframe in which aperiodic SRS is transmitted does not belong to cell-specific SRS subframes, then the aperiodic SRS transmission may collide with other PUSCH transmission in the same cell. It may be noted that PUSCH transmission can occupy any part of the UL bandwidth, including the PUCCH region, while SRS may typically be limited to the non-PUCCH region. Thus, for a given UE, it may be difficult to align SRS and PUSCH transmission bandwidth for all SRS transmission instances. For example, when an aperiodic SRS is triggered via a DL DCI, there may be no PUSCH transmission scheduled for the given UE.

To avoid such a potential conflict of resources between aperiodic transmissions and other pre-scheduled transmissions from the UE, in some designs, aperiodic SRS enabled by UL DCI may be transmitted using the same or a fraction of the bandwidth as that of PUSCH when the PUSCH assignment is completely within the non-PUCCH resource region (e.g., the region excluding DCI format 2/2a/2b).

As another option, in some designs, when the PUSCH assignment is not completely within the non-PUCCH region, then aperiodic SRS may not be triggered.

In some designs, the eNB may comprise a scheduler for controlling potential collisions between PUSCH of one UE with aperiodic SRS of another UE in the same cell. In some designs, if collision can not be avoided via appropriate scheduling, the eNB may simply not trigger aperiodic SRS transmissions for a UE.

From the PUSCH operation perspective, aperiodic SRS transmission may in general be allowed in subframes not belonging to cell-specific SRS subframes. However, when the aperiodic SRS bandwidth is the same or a subset of PUSCH, the aperiodic SRS will not be very useful for channel quality estimation purpose. On the other hand, when SRS transmissions are allocated bandwidth resources different from PUSCH, this raises the possibility that the SRS transmissions may collide with other PUSCHs in the same cell.

In some embodiments, aperiodic SRS may also use demodulation reference signal (DM-RS) locations for sounding a channel. Such as use of the DM-RS resources may be partial or total (i.e., some or all transmission resources pre-assigned to DM-RS may be used for aperiodic SRS transmissions). It will be appreciated by one of skill in the art that for PUSCH transmissions corresponding to the Rel-8 and Rel-9 specification, the resources occupied by SRS must be all DM-RS locations. In some designs, the aperiodic SRS transmissions may be triggered using different cyclic shifts from the DM-RS cyclic shift for PUSCH.

In some operational scenarios, shortened PUCCH format may not be allowed. In this case, under the SC waveform on the UL, for any UE, SRS is dropped when there is CQI/ACK/NAK simultaneously. Therefore, in some designs, when using SC waveform and when shortened PUCCH format is not operationally used, aperiodic SRS transmission may not be triggered.

However, when a relaxed SC waveform is operationally supported, periodic SRS may be transmitted along with CQI/ACK/NAK transmissions. However, for a given UE, a periodic SRS transmission and a CQI/ACK/NAK generally may not have overlapped bandwidth. Therefore, in some designs, when using relaxed SC waveform and when shortened PUCCH format is not supported, aperiodic SRS transmission may be triggered, including in subframes not belonging to cell-specific SRS subframes.

In some operational scenarios, shortened PUCCH format may be used. In such scenarios, when SC waveform is used on the UL, SRS can be transmitted with ACK/NAK, with the latter using the shortened PUCCH format. Note that in subframes not belonging to cell-specific SRS subframes, regular ACK/NAK format is used. In some designs, ACK/NAKs may be orthogonalized using non-overlapping RBs. In some other designs, aperiodic SRS and ACK/NAK transmission may not be triggered and transmitted in the same subframe. Therefore, in some designs, when using SC waveform and shortened PUCCH format, aperiodic SRS transmission may not be triggered in subframes not belonging to cell-specific SRS subframes. The same design philosophy is also applicable to the case when the relaxed SC waveform is on the UL.

Table 1 summarizes some possible designs for triggering aperiodic SRS transmissions under different operational scenarios, as discussed above.

TABLE 1

| Aperiodic SRS Triggering Support | | |
|---|---|---|
| | Regular PUCCH Format | Shortened PUCCH Format |
| SC Waveform | Not supported | Not supported |
| Relaxed SC Waveform | Supported | Not supported |

As described above, in some designs, aperiodic SRS may not triggered in subframes not belonging to cell-specific SRS subframes, except when the relaxed SC waveform is supported in the subframes and the cell does not configure shortened PUCCH format.

FIG. 11 is a flow chart representation of a method 1100 of receiving signals in a wireless communication system. At 1102, cell-specific transmission subframes may be assigned to periodic SRS transmission in a cell. At 1104, a determination may be made whether a relaxed single carrier waveform is used and whether the cell is configured for a shortened PUCCH format. At 1106, transmission resources may be allocated to aperiodic SRS transmissions based on the determination. As discussed above, for example, when using SC waveform and shortened PUCCH format, aperiodic SRS transmission may not be triggered in subframes not belonging to cell-specific SRS subframes.

FIG. 12 is a block diagram representation 1200 of a portion of an eNB (such as the eNB 110 in FIG. 1) for receiving signals in a wireless communication system. A module 1202 is provided for allocating cell-specific transmission subframes to periodic SRS transmissions in a cell (e.g., an allocator). A module 1204 is provided for determining whether a relaxed single-carrier waveform is used and whether the cell is configured for a shortened PUCCH format (e.g., a determiner). A module 1206 is provided for allocating transmission resources to aperiodic SRS transmissions based on the determination (e.g., a processor).

FIG. 13 is a flow chart representation of a method 1300 of transmitting signals in a wireless communication system. At 1302, an allocation of cell-specific transmission subframes for periodic SRS transmissions in a cell may be received. At 1304, it may be determined whether a relaxed single-carrier waveform is used and whether the cell is configured for a shortened physical uplink control channel (PUCCH) format. At 1306, at least one aperiodic SRS transmission may be selectively transmitting based on the determination.

FIG. 14 is a block diagram representation 1400 of a portion of a UE (such as the UE 120 in FIG. 1) for receiving signals in a wireless communication system. A module 1402 is provided for receiving an allocation of cell-specific transmission subframes for periodic SRS transmissions in a cell. A module 1404 is provided for determining whether a relaxed single-carrier waveform is used and whether the cell is configured for a shortened physical uplink control channel (PUCCH) format. A module 1406 is provided for selectively transmitting aperiodic SRS transmissions based on the determination.

In Rel-8 and Rel-9, in order to specify the periodic SRS transmission bandwidth, the following parameters are prescribed:

transmission comb $k_{TC}$; starting physical resource block assignment $n_{RRC}$, SRS bandwidth $B_{SRS}$, cyclic shift $n_{SRS}^{cs}$, frequency hopping bandwidth, $b_{hop}$. These parameters are defined in Section 5.5.3.2 of 3GPP TS 36.211 Specification E-UTRA: Physical Channels and Modulation document, the relevant portion of which is omitted for simplicity and is incorporated herein by reference.

In some designs, when the eNB indicates triggering of an aperiodic transmission in a downlink message, the corresponding aperiodic SRS transmission may be one-shot only, i.e., SRS may only transmitted in one subsequent subframe after a given triggering. In some designs, the aperiodic SRS transmission may be "multi-shot," i.e., one trigger may result in multiple aperiodic SRS transmissions. The operational state of whether triggering of aperiodic results in a "one-shot" or "multiple-shot" transmissions may be configured via a layer 3 message from the eNB to the UEs. In some designs, a layer 3 message may also convey how many aperiodic transmissions may result by the triggering. This may be specified as a number (e.g., 2 or 10 transmissions) or as a duration (e.g., next 10 milliseconds or 10 subframes), etc.

It will be appreciated that the use of aperiodic SRS may either be complementary or a replacement to the periodic SRS. For the latter, it may be not desirable to limit the SRS fixed to a small bandwidth in between layer 3 reconfigurations. Thus, in some designs, the eNB may configure the transmission of aperiodic SRS to have a large bandwidth, up to be the same as the cell-specific SRS bandwidth.

In some designs, the location of the aperiodic SRS may be determined based on the layer 3 configurable parameters $k_{TC}$, $n_{RRC}$, $B_{SRS}$, $b_{hop}$, and $n_{SRS}$, which is a function of the subframe index and frame index. In some designs, the set of parameters defining the aperiodic SRS transmission may be different from those defining the periodic SRS transmission. The special handling of the UpPTS case as in Rel-8 may be similarly applied.

In some designs, a UE may be layer 3 configured with a set of possible SRS transmission locations (resource assignments). When triggered for aperiodic SRS transmission, the UE may use a subset of resources from the set, based on the current subframe number and frame number.

In some designs, various SRS configuration parameters, such as the location, bandwidth and the AntInd (antenna index) of the antenna to be used for the aperiodic SRS transmission may also be explicitly indicated in a downlink control message. In some designs, the number of bits for the SRS triggering can be more than 1, such that a UE may be given information regarding which SRS location, bandwidth and/or AntInd is to be used. For example, a UE may be configured with 4 possible combinations of SRS locations and/or bandwidths and/or antenna indices, and a 2-bit SRS triggering field may be embedded in a downlink control message (e.g., DCI), such that when the 2-bit field is "00", the first SRS location and/or bandwidth and/or UL antenna index is used, when the 2-bit field is "01", second SRS location and/or bandwidth and/or UL antenna index, when the 2-bit field is "10", third SRS location and/or bandwidth and/or UL antenna index, and when the 2-bit field is "11", fourth SRS location and/or bandwidth and/or UL antenna index.

In some designs, the frequency resources assigned to the aperiodic SRS transmission may be contiguous. In some other designs, the frequency resources assigned to the aperiodic SRS transmission may not be contiguous.

In some designs, a mixture of the implicit and explicit signaling approaches may be used. For example, some of the parameters may be explicitly signaled in a downlink message, while other configuration parameters for aperiodic SRS transmissions may be implicitly signaled.

In some designs, when there is a PUSCH transmission in a subframe, scheduling request (SR) is a part of the MAC payload. In such a case, there is no interaction between aperiodic SRS and SR. Alternatively in some designs, when aperiodic SRS transmission is triggered via DL DCI, SR may be transmitted on PUCCH. When using SC waveform UL, aperiodic SRS may therefore not be triggered in the subframes configured for SR transmissions because as SRS would be dropped if no shortened SR format. When using the relaxed SC waveform UL, SRS and SR may be transmitted simultaneously.

Therefore, in some designs, aperiodic SRS transmission may not be triggered in SR subframes when there is no PUSCH transmission in the subframe and SC waveform does not support of shortened PUCCH format. Other subframes may be used to trigger aperiodic SRS transmissions.

FIG. 15 is a flow chart representation of a method 1500 of transmitting signals in a wireless communication system. At 1502, it may be determined whether a physical uplink shared control channel (PUSCH) transmission is performed in a subframe. At 1504, when no PUSCH transmission is performed in the subframe, a transmission of aperiodic SRS in subframes comprising a scheduling SR when a shortened PUCCH is not used in the subframe, may be suppressed.

FIG. 16 is a block diagram representation 1600 of a portion of a UE (such as the UE 120 in FIG. 1) for receiving signals in a wireless communication system. The module 1602 is provided for determining whether a PUSCH transmission is performed in a subframe. The module 1604 is provided for suppressing, when no PUSCH transmission is performed in the subframe, a transmission of aperiodic SRS in subframes comprising a scheduling request (SR) when a shortened PUCCH is not used in the subframe.

In some designs, when aperiodic SRS transmissions complement periodic SRS transmission, i.e., are triggered in addition to the pre-scheduled periodic SRS transmissions, the two SRS transmissions may be time domain multiplexed (TDM) to be transmitted in different cell-specific SRS subframes. Alternatively, periodic and aperiodic SRS transmissions may share the same subframe. In general, the eNB may control how periodic and aperiodic SRS transmission are integrated with each other for transmissions. In some designs, the same set of UE-specific SRS bandwidth may be used for periodic SRS transmissions and aperiodic SRS transmissions.

In some designs, when transmission resources for aperiodic and periodic transmissions do not overlap, both periodic and aperiodic SRS may be transmitted. In some designs, when transmission resources for aperiodic and periodic transmissions overlap, because aperiodic SRS may be triggered based on instantaneous (or short term) need, aperiodic SRS may transmitted and periodic SRS transmission may be suppressed. In some designs, aperiodic SRS transmissions may use the same set of UE-specific SRS configuration parameters defined for the periodic SRS transmissions. In some designs, depending on instantaneous need, more or less bandwidth may be allocated to aperiodic SRS transmissions.

FIG. 17 is a flow chart representation of a method 1700 of transmitting signals in a wireless communication system. At 1702, it may be determined whether transmission resources for an periodic SRS transmission in a subframe overlap with transmission resources for the aperiodic SRS transmission. At 1704, when the transmission resources for the aperiodic and the periodic SRS transmissions do not overlap, both the aperiodic and the periodic SRS transmissions may be transmitted. At 1706, when the transmission resources for the aperiodic and the periodic SRS transmissions overlap, only the aperiodic SRS transmission may be transmitted.

FIG. 18 is a block diagram representation 1800 of a portion of a UE (such as the UE 120 in FIG. 1) for receiving signals in a wireless communication system. A module 1802 is provided for determining whether transmission resources for an periodic SRS transmission in a subframe overlap with transmission resources for the aperiodic SRS transmission. A module 1804 is provided for transmitting both the aperiodic and the periodic SRS transmissions, when the transmission resources for the aperiodic and the periodic SRS transmissions do not overlap. A module 1806 is provided for transmitting only the aperiodic SRS transmission, when the transmission resources for the aperiodic and the periodic SRS transmissions overlap.

In some wireless systems, such as LTE-A, single-user MIMO (SU-MIMO) may be supported in the UL. A UE may comprise more than one antenna. For example, in some designs, two or four virtual UL antennas may be defined. In such designs, aperiodic SRS triggering may be configured to individually trigger the two or four virtual UL antennas. For example, in some designs, only one triggering downlink message may be used, but once set, the message may trigger simultaneous SRS transmission from all antennas. Alternatively, in some designs, a given downlink message may trigger aperiodic transmissions from only one antenna. The identity of the antenna used may be specified by the triggering message or may be pre-determined. The identity may also be configured by a higher layer message.

In some designs, a given downlink message may trigger aperiodic transmission for one antenna, but the antenna used for the subsequent SRS transmission may be alternated by the UE among all possible transmission antennas. For example, when a UE has two antennas antenna 0 and antenna 1, the UE may perform aperiodic SRS transmissions using antenna 0 based on the first trigger, antenna 1 based on the second trigger, antenna 0 based on the third trigger and so on. In some designs, the antenna switching mechanism may use the subframe index and frame index, and can be in the format of $n_{SRS}$. The switching may be dependent on whether $n_{SRS}$ is odd or even, and possible other parameters (e.g., hopping or not, etc).

In some designs, multiple independent triggering messages may be used, each addressing a given antenna of the UE. For example, in some designs, the downlink message may trigger aperiodic SRS transmissions using one or more bits and further specify the antenna to be used using additional one or more bits.

In some designs, the eNB may determine one of the multiple antenna signaling modes as discussed above and indicate the mode to be used to the UEs using a higher layer message.

Figures 19, 20:
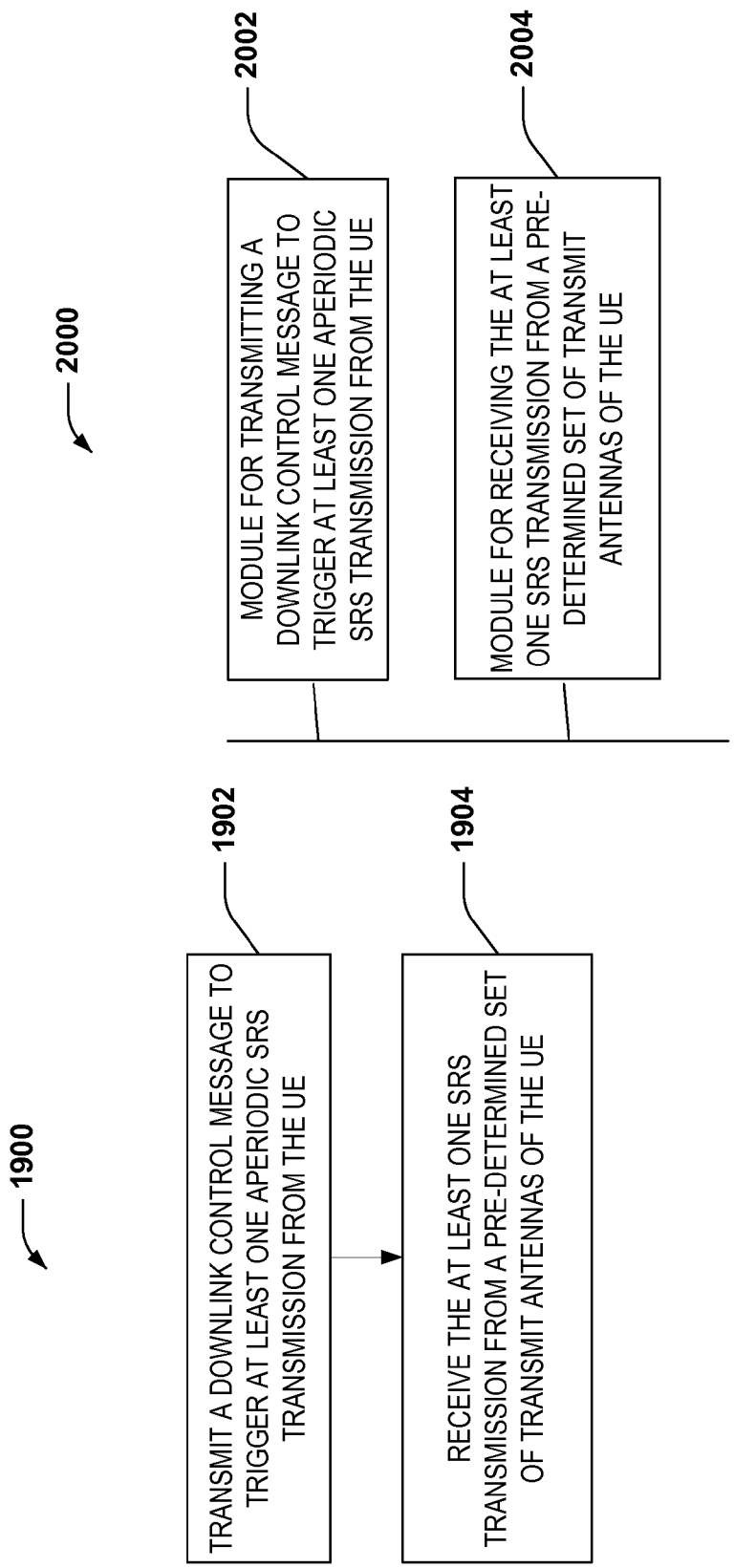
FIG. 19 is a flow chart representation of a process of allocating transmission resources for aperiodic sounding reference signal (SRS) transmissions to a user equipment (UE) comprising multiple transmit antennas.
FIG. 20 is a block diagram representation of a portion of an apparatus for allocating transmission resources for aperiodic sounding reference signal (SRS) transmissions to a user equipment (UE) comprising multiple transmit antennas.

FIG. 19 is a flow chart representation of a method 1900 of receiving signals in a wireless communication system. At 1902, a downlink control message to trigger at least one aperiodic SRS transmission for a UE may be transmitted. At 1904, the at least one aperiodic SRS transmission may be received from a pre-determined set of transmit antennas of the UE. As discussed above, the pre-determined set of antennas may include one or more antennas and may be based on an antenna sequence.

FIG. 20 is a block diagram representation 2000 of a portion of an eNB (such as the eNB 110 in FIG. 1) for receiving signals in a wireless communication system. A module 2002 is provided for transmitting a downlink control message to trigger at least one aperiodic SRS transmission for a UE. A module 2004 is provided for receiving the at least one SRS transmission from a pre-determined set of transmit antennas of the UE.

Figures 21, 22:
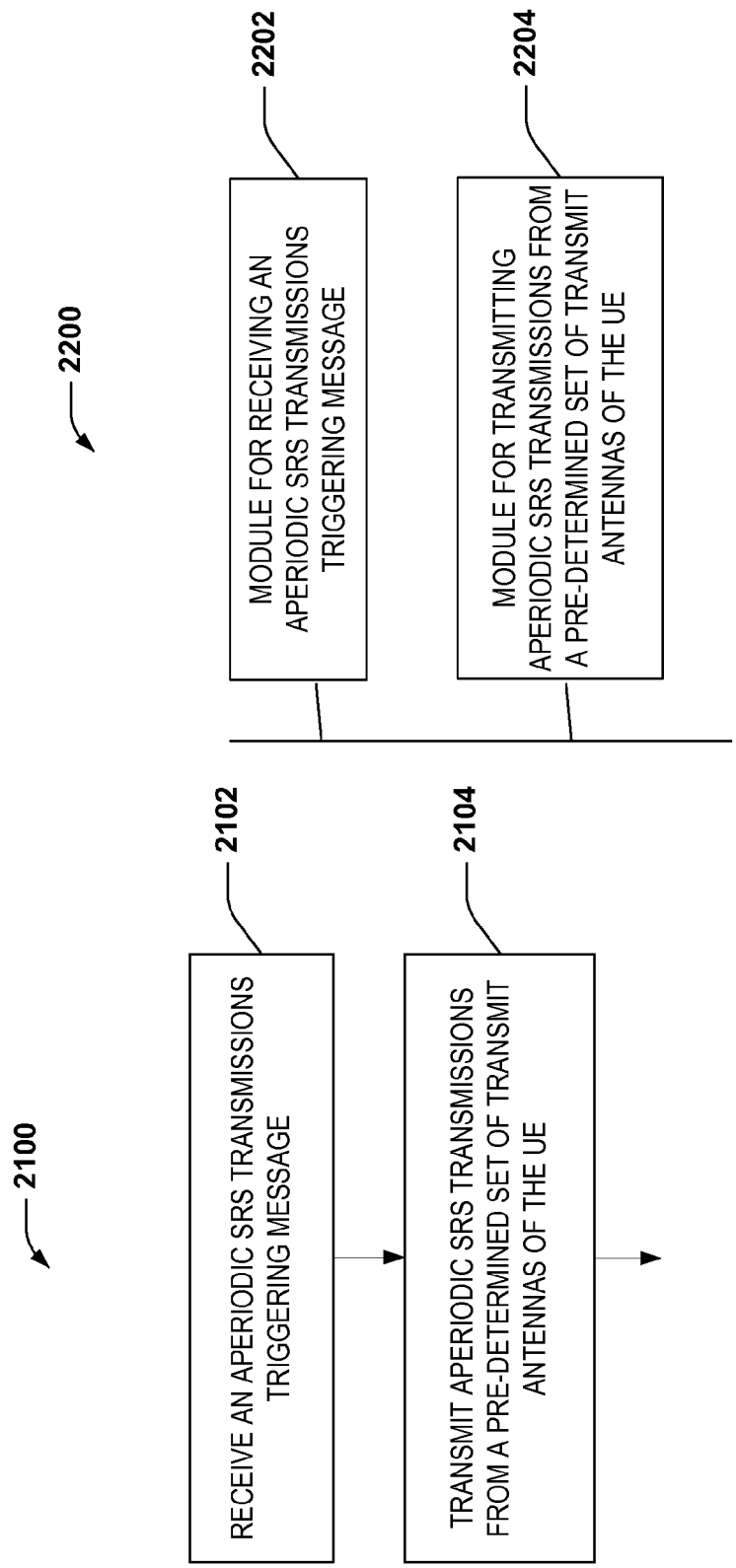
FIG. 21 is a flow chart representation of transmitting aperiodic sounding reference signal (SRS) transmissions from a user equipment (UE) comprising multiple transmit antennas.
FIG. 22 is a block diagram representation of a portion of an apparatus transmitting aperiodic sounding reference signal (SRS) transmissions from a user equipment (UE) comprising multiple transmit antennas.

FIG. 21 is a flow chart representation of a method 2100 of transmitting aperiodic SRS in a wireless communication system. At 2102, an aperiodic SRS transmissions triggering message may be received (e.g., via a downlink control message). At 2104, aperiodic SRS transmissions from a pre-determined set of transmit antennas of the UE may be transmitted. As previously discussed, alternatively, the downlink control message may indicate the transmit antenna to be used for the aperiodic SRS transmission.

FIG. 22 is a block diagram representation 2200 of a portion of a UE (such as the UE 120 in FIG. 1). A module 2202 is provided for receiving an aperiodic SRS transmissions triggering message. A module 2204 is provided for transmitting aperiodic SRS transmissions from a pre-determined set of transmit antennas of the UE.

In some designs, when operating in TDD, periodic SRS may be transmitted in uplink pilot time slots (UpPTS). Because UpPTS does not contain any PUCCH and PUSCH transmissions, it may not be possible to trigger aperiodic SRS transmissions by following the timing relationship previously discussed (e.g., triggering in UL DCI may result in PUSCH, while triggering in DL DCI may result in aperiodic SRS transmissions following ACK/NAK). However, it may be desirable to support aperiodic SRS transmission in UpPTS as well, especially given that up to two symbols in UpPTS are available for SRS transmissions. Furthermore, in TDD operation, it may be possible to sound the entire UL system bandwidth.

Therefore, in some designs, DL and/or UL DCIs may be used to trigger aperiodic SRS transmissions in UpPTS. Such a triggering may provide the opportunity to significantly optimize the channel and therefore may be especially advantageous in DL heavy configurations. For instance, in Configuration 5, where there are 8 full DL subframes, one special subframe and one UL subframe, in some designs, some of the DL subframes may trigger aperiodic SRS transmission in UpPTS. This may be performed, for example, using DL DCI. In some designs, different subframes may trigger different SRS transmission locations and/or bandwidths in UpPTS and/or regular UL subframes, to ensure sounding of the entire channel bandwidth. Therefore, in some designs, two or more DL subframes may be designated to trigger aperiodic SRS in UpPTS or regular UL subframes, with different DL subframes designated to trigger aperiodic SRS transmissions in different locations and/or bandwidths and/or UL antennas. In some designs, the UE may be configured to perform aperiodic SRS transmissions only based on a single trigger received from the multiple DL subframes. For example, the UE may only transmit based on the first received aperiodic SRS triggering downlink message.

Figures 23, 24:
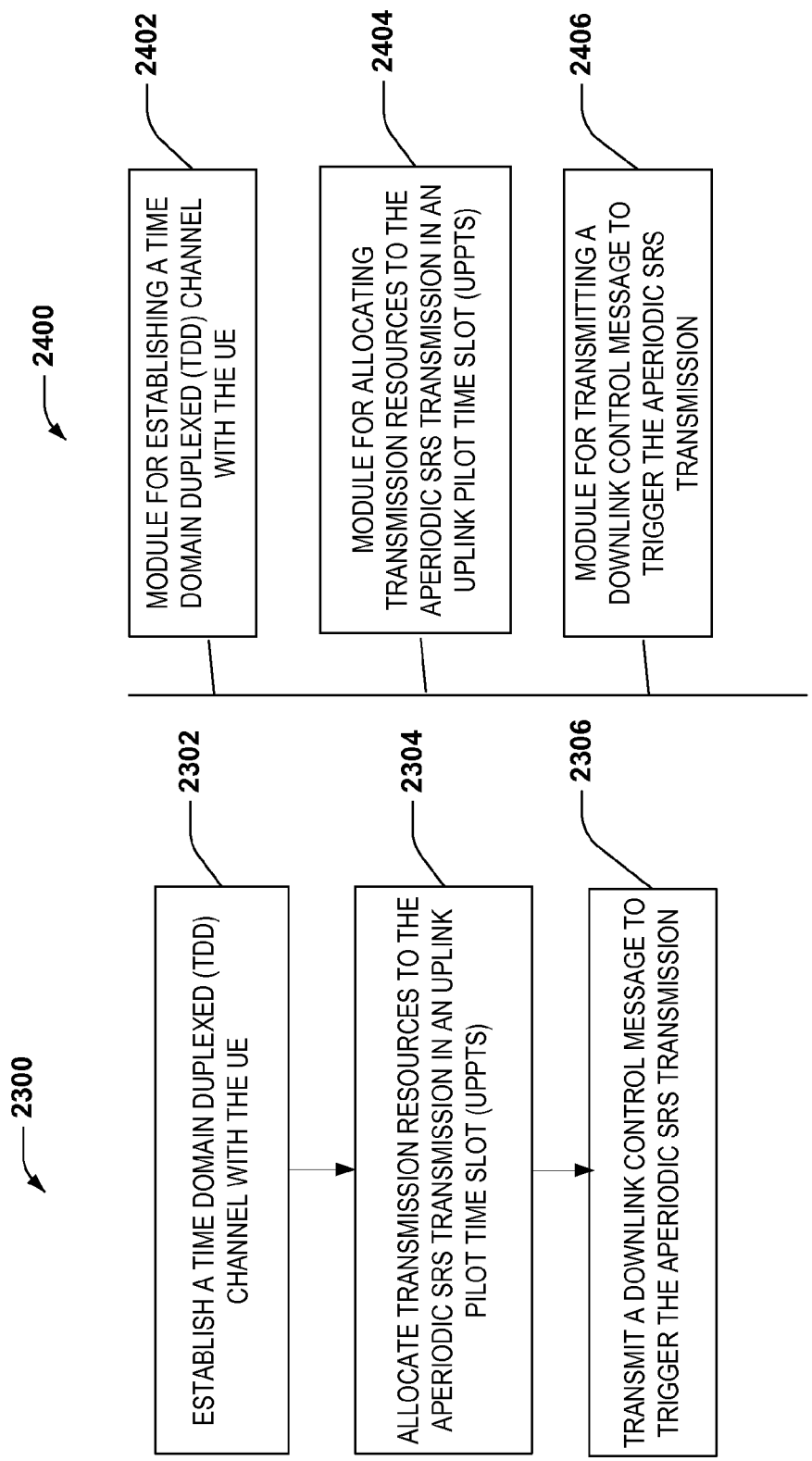
FIG. 23 is a flow chart representation of a process of triggering transmission of aperiodic sounding reference signal (SRS) from a user equipment (UE).
FIG. 24 is a block diagram representation of a portion of an apparatus for triggering transmission of aperiodic sounding reference signal (SRS) from a user equipment (UE).

FIG. 23 is a flow chart representation of a method 2300 of receiving signals in a wireless communication system. At 2302, a TDD channel may be established with a UE. At 2304, transmission resources may be allocated for aperiodic SRS transmission from the UE in the UpPTS. At 2306, a downlink control message may be transmitted to trigger the aperiodic SRS transmission.

FIG. 24 is a block diagram representation 2400 of a portion of an eNB (such as the eNB 110 in FIG. 1) for receiving signals in a wireless communication system. A module 2402 is provided for establishing a TDD channel with the UE. A module 2404 is provided for allocating transmission resources to the aperiodic SRS transmission in the UpPTS (e.g., an allocator). A module 2406 is provided for transmitting a downlink control message to trigger the aperiodic SRS transmission (e.g., a transmitter).

FIG. 25 is a flow chart representation of a method 2500 of aperiodic SRS transmission. At 2502, a time domain duplexed (TDD) channel may be established. At 2504, transmission resources for the aperiodic SRS transmission in an uplink pilot time slot (UpPTS) may be received. At 2506, a downlink control message to trigger the aperiodic SRS transmission may be received.

FIG. 26 is a block diagram representation 2600 of a portion of a UE (such as the UE 120 in FIG. 1) for receiving signals in a wireless communication system. A module 2602 is provided for establishing a time domain duplexed (TDD) channel. A module 2604 is provided for receiving transmission resources to the aperiodic SRS transmission in an uplink pilot time slot (UpPTS). A module 2606 is provided for receiving a downlink control message to trigger the aperiodic SRS transmission In some wireless networks, a UE may be configured to operate using multiple component carriers (CCs). In such configuration, the transmission of multiple ACK/NAKs in response to multiple DL PDSCH transmissions over multiple CCs can be configured via layer 3 to occur on a single UL anchor carrier. In some designs, the transmission of ACK/NAK for one DL carrier may be performed on the paired UL carrier.

The availability of multiple carriers raises at least the following issues:

Issue 1: When aperiodic SRS is triggered, which UL carrier should the UE use to transmit the corresponding SRS transmission?

Issue 2: When two or more triggers are received for one UL carrier, how should the UE handle such multiple triggers?

To address Issue 1, in some designs, the UL carrier used to transmit the SRS may be based on the ACK/NAK association and the PUSCH association. For example, in some designs, when aperiodic SRS is triggered via UL DCI, the corresponding aperiodic SRS transmission may be transmitted using the same carrier as PUSCH. In some designs, when aperiodic SRS is triggered via DL DCI, the corresponding aperiodic SRS transmission may use the same carrier as ACK/NAK. In some designs, when aperiodic SRS is triggered via SRS DCI, the association of the corresponding aperiodic SRS may be made based on PUSCH, ACK/NAK, or DL/UL pairing.

To address Issue 2, in some designs, for each UL carrier, when the UE receives two or more triggers, the UE may only perform the corresponding aperiodic SRS transmission based on the trigger received from the pairing DL carrier. In some other designs, multiple SRS transmissions with different SRS characteristics may be indicated by different triggers indicated on the DL.

FIG. 27 is a flow chart representation of a method 2700 of receiving signals in a wireless communication system. At 2702, a UE may be configured with multiple CCs. At 2704, aperiodic SRS transmission from the UE may be triggered based on a control message.

FIG. 28 is a block diagram representation 2800 of a portion of an eNB (such as the eNB 110 in FIG. 1) for receiving signals in a wireless communication system. A module 2802 is provided for configuring the UE with multiple CCs. A module 2802 is provided for triggering an aperiodic SRS transmission based on a control message.

FIG. 29 is a flow chart representation of a method 2900 of facilitating transmission of aperiodic sounding reference signals (SRS) in a wireless communication system. At 2902, a UE may be configured with multiple component carriers (CCs). At 2904, aperiodic SRS transmission may be performed based on a received control message. A carrier may be chosen for the aperiodic SRS transmission from among the various rules previously discussed.

FIG. 30 is a block diagram representation 3000 of a portion of a UE (such as the UE 120 in FIG. 1) for transmitting aperiodic SRS. A module 3002 is provided for configuring the UE with multiple component carriers (CCs). A module 3004 is provided for performing the aperiodic SRS transmission based on a received control message.

In some designs, the UE may perform power control on aperiodic SRS transmissions using similar techniques defined for periodic SRS power control in Rel-8 and Rel-9. In some designs, same transmission power control inner loop as used for PUSCH may be used for controlling the power of an aperiodic SRS transmission. In some designs, the transmitted power of aperiodic SRS transmissions may be adjusted based on transmission bandwidth using one of the several well known techniques. Therefore, in some designs, transmission power may be adjusted based on actual aperiodic SRS transmission bandwidth, which may in general be different from that of the periodic SRS transmissions.

FIG. 31 is a flow chart representation of a method 3100 of receiving signals in a wireless communication system. At 3102, power control information for controlling transmission power of an aperiodic SRS transmission may be transmitted in a higher layer message. At 3104, a power controlled aperiodic SRS transmission may be received.

FIG. 32 is a block diagram representation 3200 of a portion of an eNB (such as the eNB 110 in FIG. 1) for receiving signals in a wireless communication system. The module 3202 is provided for transmitting, in a higher layer message, power control information for controlling transmission power of an aperiodic SRS transmission. The module 3204 is provided for receiving the power controlled aperiodic SRS transmission.

FIG. 33 is a flow chart representation 3300 of a method of transmitting signals in a wireless communication system. At 3302, power control information may be received via a higher layer control message (e.g., layer 3). At 3304, the transmission power of the aperiodic SRS transmission may be controlled based on the received power control information.

FIG. 34 is a block diagram representation 3400 of a portion of a UE (such as the UE 120 in FIG. 1) for receiving signals in a wireless communication system. A module 3402 is provided for receiving, in a higher layer message, power control information. A module 3404 is provided for controlling transmission power of the aperiodic SRS transmissions based on the received power control information.

In some designs, the eNB may reconfigure the format of downlink control messages (e.g., DCI) from one size to another. When aperiodic SRS transmissions are triggered based on a portion of the downlink control message, during the reconfiguration, there may not be a common DCI format that the eNB can reliably use to communicate with the UE. To enable the triggering of aperiodic SRS transmissions during such reconfiguration periods, in some designs, SRS triggering may be enabled only for some downlink control message formats, e.g., DCI formats other than DCI format 0 and DCI format 1A. In some designs, aperiodic SRS triggering may be triggered for all DCI formats, but for DCI formats 0 and 1A, SRS triggering may not be enabled in the common search space. In wireless systems that use multiple carriers, at least one carrier may be configured to follow one of these configuration options.

FIG. 35 is a flow chart representation of a method 3500 of receiving signals in a wireless communication system. At 3502, a format of a downlink message may be reconfigured. At 3504, during the reconfiguration, an aperiodic SRS transmission may be triggered using a downlink control message.

FIG. 36 is a block diagram representation 3600 of a portion of an eNB (such as the eNB 110 in FIG. 1) for receiving signals in a wireless communication system. A module 3602 is provided for reconfiguring format of downlink control messages. A module 3604 is provided for triggering an aperiodic SRS transmission during the reconfiguration by using a downlink control message.

FIG. 37 is a flow chart representation of a method 3700 of performing an aperiodic sounding reference signal (SRS) transmission in a wireless communication system. At 3702, transmission resource allocation message for the aperiodic SRS transmission may be received. At 3704, based on a downlink control information (DCI) message, the aperiodic SRS transmission may be performed. The DCI message is selected from a plurality of possible message formats, including message formats 0 and 1A, such that formats 0 and 1A are not used when the DCI message may be transmitted in a common search space.

FIG. 38 is a block diagram representation 3800 of a portion of a UE (such as the UE 120 in FIG. 1) for transmitting aperiodic SRS in a wireless communication system. A module 3802 is provided for receiving a transmission resource allocation message for the aperiodic SRS transmission. A module 3804 is provided for performing, based on a downlink control information (DCI) message, the aperiodic SRS transmission. The DCI message is selected from a plurality of possible message formats, including message formats 0 and 1A, such that formats 0 and 1A are not used when the DCI message is transmitted in a common search space.

Some wireless networks may be configured for relay backhaul operations. A relay backhaul may be a planned deployment, but the UE that performs the relaying function, may be anywhere. In a typical relay backhaul configuration, the UE may however have a good channel (e.g., line-of-sight) with the eNB. Therefore, in a typical relay backhaul deployment, optimization options such as precoding, multi-user MIMO (MU-MIMO), aggregation levels may be used. In LTE-A, there is some discussion about introducing a new PDCCH for relay backhaul (hence called R-PDCCH) or for LTE-A UEs in the heterogeneous networks, where the new PDCCH (R-PDCCH) occupies the data region.

Figure 39:
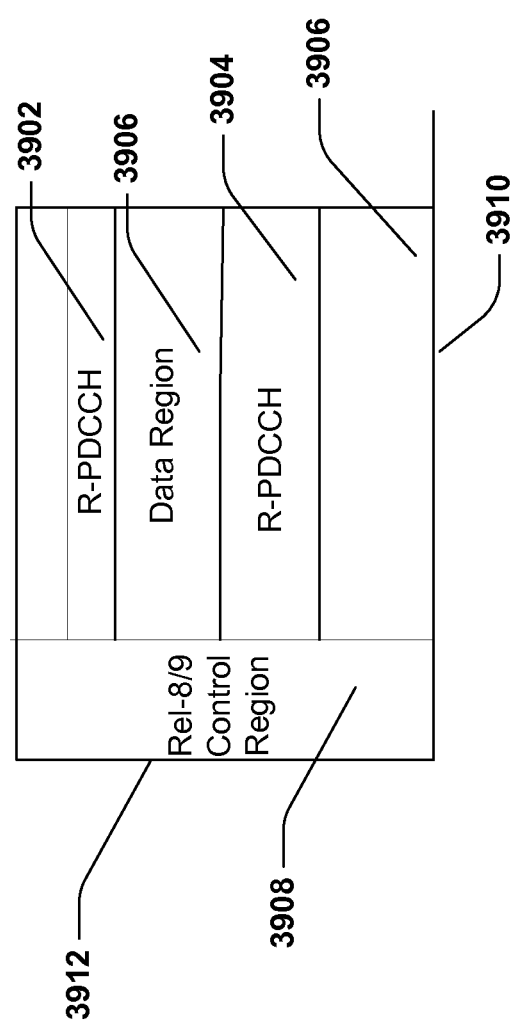
FIG. 39 is a block diagram representation of transmission resources assigned to a relay backhaul transmission signal.

FIG. 39 shows an example resource utilization for the R-PDCCH. A horizontal axis 3910 represents time (e.g., time slots) and a vertical axis 3912 represents frequency. As illustrated in FIG. 39, R-PDCCH may be allocated transmission resources 3902, 3904 embedded within data region 3906, separate from Rel-8/Rel-9 control region 3908.

In general, most of the above discussion regarding the downlink triggering indication, bandwidth selection, timing, multi-carrier operation, reconfiguration fallback operation, etc. of aperiodic SRS transmission may carry over in a relay backhaul configuration.

FIG. 40 is a flow chart representation of a method 4000 of receiving signals in a wireless communication system. At 4002, transmission resources may be allocated to an aperiodic SRS transmission. At 4004, the aperiodic SRS transmission may be triggered by transmitting a downlink control message in an R-PDCCH.

FIG. 41 is a block diagram representation 4100 of a portion of an eNB (such as the eNB 110 in FIG. 1) for receiving signals in a wireless communication system. A module 4102 is provided for allocating transmission resources to an aperiodic SRS transmission. A module 4104 is provided for triggering the aperiodic SRS transmission by transmitting a downlink control message in an R-PDCCH.

FIG. 42 is a flow chart representation of a method 4200 of transmitting an aperiodic SRS transmission in a wireless communication system. At 4202, a transmission resource allocation for the aperiodic SRS transmission may be received. At 4204, the aperiodic SRS transmission may be performed based on a downlink control message received in a relay physical downlink control channel (R-PDCCH).

FIG. 43 is a block diagram representation 4300 of a portion of a UE (such as the UE 120 in FIG. 1) for transmitting an aperiodic SRS transmission. A module 4302 is provided for receiving a transmission resource allocation for the aperiodic SRS transmission. A module 4304 is provided for performing the aperiodic SRS transmission based on a downlink control message received in a relay physical downlink control channel (R-PDCCH).

FIG. 44 is a flow chart representation of a signal transmission method 4400 for use in a wireless communication system. At 4402, a configuration for transmitting CQI in a subframe may be received. For example, the configuration may be a downlink control message in which a subframe for the transmission of the CQI is implicitly (e.g., 4 milliseconds later) or explicitly indicated. At 4404, a trigger may be received for transmitting an aperiodic SRS in the same uplink transmission subframe. The trigger may comprise one or more bits of a downlink message, as previously discussed.

Furthermore, in some designs, the trigger and the configuration for CQI transmission may be received in the same downlink control message. Based on the received configuration and trigger, in some designs, a UE may transmit the CQI in the subframe but not transmit the aperiodic SRS in the subframe. Alternatively, based on the received configuration and trigger, in some designs, a UE may transmit the aperiodic SRS in the subframe designated by the received message but not transmit the CQI in the designated subframe.

FIG. 45 is a block diagram representation 4500 of a portion of a UE (such as the UE 120 in FIG. 1). A module 4502 is provided for receiving a configuration for transmitting a channel quality indicator (CQI) message in a subframe. A module 4504 is provided for receiving a trigger for transmitting an aperiodic sounding reference signal (SRS) in the subframe.

It will be appreciated that several enhancements to SRS transmissions are described herein. In one aspect, a method for triggering transmission of SRS by modifying existing Rel-8 and Rel-9 downlink control messages is discloses. The timing rules for transmission of aperiodic SRS after the triggering message is transmitted (and received) is also disclosed.

Further, it will be appreciated that the interaction between aperiodic SRS transmissions and cell-specific SRS subframes is disclosed. Various techniques for selection of resource location for aperiodic SRS transmissions and/or bandwidth utilized for aperiodic SRS transmissions are disclosed.

In addition, various techniques for co-existence and interaction of aperiodic SRS transmissions with SR and with periodic SRS transmissions are disclosed. Several techniques for using one or more of UE antennas for aperiodic transmissions are provided. The use of aperiodic SRS transmissions in a TDD system and piggy-backing of SRS transmissions on UpPTS is also discussed. Furthermore, techniques for triggering aperiodic SRS transmissions during reconfiguration of downlink control messaging format ("fallback operation") are also disclosed. A new possible PDCCH resource region usefully in a relay backhaul configuration, useful for the transmission of aperiodic SRS transmissions, is disclosed.

In a design, provided is a method for wireless communication which includes transmitting, in a higher layer message, power control information for controlling transmission power of an aperiodic SRS transmission and receiving the power controlled aperiodic SRS transmission.

In another design, provided is an apparatus for wireless communication which includes means for transmitting, in a higher layer message, power control information for controlling transmission power of an aperiodic SRS transmission and means for receiving the power controlled aperiodic SRS transmission.

In yet another design, provided is a method for wireless communication which includes receiving, in a higher layer message, power control information; and controlling transmission power of the aperiodic SRS transmissions based on the received power control information.

In other designs, provided is an apparatus for wireless communication which includes means for receiving, in a higher layer message, power control information and means for controlling transmission power of the aperiodic SRS transmissions based on the received power control information.

In a design, provided is a method of triggering an aperiodic sounding reference signal (SRS) transmission in a relay backhaul of a wireless communication network. The method includes allocating transmission resources to the aperiodic SRS transmission and triggering the aperiodic SRS transmission by transmitting a downlink control message in a relay physical downlink control channel (R-PDCCH).

In another design, provided is an apparatus for triggering an aperiodic sounding reference signal (SRS) transmission in a relay backhaul of a wireless communication network. The apparatus includes means for allocating transmission resources to the aperiodic SRS transmission and means for triggering the aperiodic SRS transmission by transmitting a downlink control message in a relay physical downlink control channel (R-PDCCH).

In some designs, provided is a method of performing an aperiodic sounding reference signal (SRS) transmission in a relay backhaul of a wireless communication network. The method includes receiving a transmission resource allocation for the aperiodic SRS transmission and performing the aperiodic SRS transmission based on a downlink control message received in a relay physical downlink control channel (R-PDCCH).

In still other designs, provided is an apparatus for performing an aperiodic sounding reference signal (SRS) transmission in a relay backhaul of a wireless communication network. The apparatus includes means for receiving a transmission resource allocation for the aperiodic SRS transmission and means for performing the aperiodic SRS transmission based on a downlink control message received in a relay physical downlink control channel (R-PDCCH).

In a design, provided is a method for wireless communication which includes reconfiguring a format used for downlink control messaging and triggering an aperiodic sounding reference signal (SRS) transmission during the reconfiguring using a downlink control message. The downlink control message is selected from a plurality of possible message formats, including message formats 0 and 1A, such that formats 0 and 1A are not used when the downlink control message is transmitted in a common search space.

In another design, provided is an apparatus for wireless communication which includes means for reconfiguring a format used for downlink control messaging and means for triggering an aperiodic sounding reference signal (SRS) transmission during the reconfiguring using a downlink control message. The downlink control message is selected from a plurality of possible message formats, including message formats 0 and 1A, such that formats 0 and 1A are not used when the downlink control message is transmitted in a common search space.

In some designs, provided is a method of performing an aperiodic sounding reference signal (SRS) transmission in a wireless communication system. The method includes receiving a transmission resource allocation message for the aperiodic SRS transmission and performing, based on a downlink control information (DCI) message, the aperiodic SRS transmission. The DCI message is selected from a plurality of message formats, including message formats 0 and 1A, such that formats 0 and 1A are not used when the DCI message is transmitted in a common search space.

In some other designs, provided is an apparatus for performing an aperiodic sounding reference signal (SRS) transmission in a wireless communication system. The apparatus includes means for receiving a transmission resource allocation message for the aperiodic SRS transmission and means for performing, based on a downlink control information (DCI) message, the aperiodic SRS transmission. The DCI message is selected from a plurality of message formats, including message formats 0 and 1A, such that formats 0 and 1A are not used when the DCI message is transmitted in a common search space.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

What is claimed is:

1. A method for wireless communication, comprising:
   receiving a first downlink control message, wherein the first downlink control message is created by modifying a portion of a second downlink control message, wherein the second downlink control message does not trigger an aperiodic sounding reference signal (SRS) transmission and wherein the first downlink control message indicates resources allocated to the aperiodic SRS transmission; and
   transmitting an aperiodic SRS based on the received first downlink control message.

2. The method of claim 1, wherein the receiving comprises receiving the first downlink control message in a random access response message.

3. The method of claim 1, wherein the portion of the second downlink control message comprises one of a one bit field and a two bit field.

4. The method of claim 1, wherein the transmitting comprises transmitting the aperiodic SRS after a pre-determined time period after receiving the first downlink control message.

5. The method of claim 4, wherein the pre-determined time period is at least 4 milliseconds.

6. The method of claim 1, wherein the portion of the second downlink control message comprises an addition of a one bit field to create the first downlink control message.

7. The method of claim 6, wherein the resources allocated to the aperiodic SRS transmission are associated with the one bit field and are configured by higher layer.

8. An apparatus for wireless communication, comprising:
   means for receiving a first downlink control message, wherein the first downlink control message is created by modifying a portion of a second downlink control message, wherein the second downlink control message does not trigger an aperiodic sounding reference signal (SRS) transmission and wherein the first downlink control message indicates resources allocated to the aperiodic SRS transmission;
   means for transmitting an aperiodic SRS based on the received first downlink control message.

9. The apparatus of claim 8, wherein the means for receiving comprises means for receiving the first downlink control message in a random access response message.

10. The apparatus of claim 8, wherein the portion of the second downlink control message comprises one of a one bit field and a two bit field.

11. The apparatus of claim 8, wherein the means for transmitting comprises means for transmitting the aperiodic SRS after a pre-determined time period after receiving the first downlink control message.

12. The apparatus of claim 11, wherein the pre-determined time period is at least 4 milliseconds.

13. The apparatus of claim 8, wherein the portion of the second downlink control message comprises an addition of a one bit field to create the first downlink control message.

14. The apparatus of claim 13, wherein the resources allocated to the aperiodic SRS transmission are associated with the one bit field and are configured by higher layer.

15. An apparatus for wireless communication, comprising:
   a processor configured to:
      receive a first downlink control message, wherein the first downlink control message is created by modifying a portion of a second downlink control message, wherein the second downlink control message does not trigger an aperiodic sounding reference signal (SRS) transmission and wherein the first downlink control message indicates resources allocated to the aperiodic SRS transmission; and
      transmit an aperiodic SRS based on the received first downlink control message; and
   memory coupled to the processor.

16. The apparatus of claim 15, wherein the processor is further configured to receive the first downlink control message in a random access response message.

17. The apparatus of claim 15, wherein the portion of the second downlink control message comprises one of a one bit field and a two bit field.

18. The apparatus of claim 15, wherein the processor is further configured to transmit the aperiodic SRS after a pre-determined time period after receiving the first downlink control message.

19. The apparatus of claim 18, wherein the pre-determined time period is at least 4 milliseconds.

20. The apparatus of claim 15, wherein the portion of the second downlink control message comprises an addition of a one bit field to create the first downlink control message.

21. The apparatus of claim 20, wherein the resources allocated to the aperiodic SRS transmission are associated with the one bit field and are configured by higher layer.

22. A computer program product comprising a non-transitory computer-readable storage medium, the non-transitory computer-readable storage medium comprising:
   instructions for causing a computer to receive a first downlink control message, wherein the first downlink control message is created by modifying a portion of a second downlink control message, wherein the second downlink control message does not trigger an aperiodic sounding reference signal (SRS) transmission and wherein the first downlink control message indicates resources allocated to the aperiodic SRS transmission; and instructions for causing the computer to transmit an aperiodic SRS based on the received first downlink control message.

23. The computer program product of claim 22, wherein the non-transitory computer-readable storage medium further comprises instructions for causing the computer to receive the first downlink control message in a random access response message.

24. The computer program product of claim 22, wherein the portion of the second downlink control message comprises one of a one bit field and a two bit field.

25. The computer program product of claim 22, wherein the non-transitory computer-readable storage medium further comprises instructions for causing the computer to transmit the aperiodic SRS after a pre-determined time period after receiving the first downlink control message.

26. The computer program product of claim 25, wherein the pre-determined time period is at least 4 milliseconds.

27. The computer program product of claim 22, wherein the portion of the second downlink control message comprises an addition of a one bit field to create the first downlink control message.

28. The computer program product of claim 27, wherein the resources allocated to the aperiodic SRS transmission are associated with the one bit field and are configured by higher layer.

* * * * *